United States Patent
Grandau

(10) Patent No.: US 12,032,554 B2
(45) Date of Patent: Jul. 9, 2024

(54) UTILIZING INDEPENDENTLY STORED VALIDATION KEYS TO ENABLE AUDITING OF INSTRUMENT MEASUREMENT DATA MAINTAINED IN A BLOCKCHAIN

(71) Applicant: Thermo Electron Scientific Instruments LLC, Madison, WI (US)

(72) Inventor: Mark C. Grandau, Verona, WI (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 0 days.

(21) Appl. No.: 17/726,649

(22) Filed: Apr. 22, 2022

(65) Prior Publication Data

US 2022/0245128 A1    Aug. 4, 2022

Related U.S. Application Data

(63) Continuation of application No. 16/710,003, filed on Dec. 11, 2019, now Pat. No. 11,321,305.

(Continued)

(51) Int. Cl.
*G06F 16/23* (2019.01)
*G06F 16/215* (2019.01)
*G06F 16/21* (2019.01)

(52) U.S. Cl.
CPC ........ *G06F 16/2365* (2019.01); *G06F 16/215* (2019.01); *G06F 16/2379* (2019.01)

(58) Field of Classification Search
CPC .............. G06F 16/2365; G06F 16/215; G06F 16/2379; G06F 21/64; G06F 11/3013;

(Continued)

(56) References Cited

U.S. PATENT DOCUMENTS

| 2011/0231106 A1 | 9/2011 | Brandon et al. |
| 2013/0096943 A1 | 4/2013 | Carey et al. |

(Continued)

FOREIGN PATENT DOCUMENTS

| WO | 2018005129 A1 | 1/2018 |
| WO | 2018125989 A2 | 7/2018 |

OTHER PUBLICATIONS

Aug. 1, 2022—(EP) Extended European Search Report—App. No. 19896970.1.

(Continued)

*Primary Examiner* — Kris E Mackes
*Assistant Examiner* — Cecile H Vo
(74) *Attorney, Agent, or Firm* — Michael Best & Friedrich LLP

(57) ABSTRACT

Aspects of the disclosure relate to utilizing independently stored validation keys to enable auditing of instrument measurement data maintained in a blockchain. A computing platform may receive, from a first block generator, a first data block comprising first measurement data captured by a first instrument and associated with a sample. Subsequently, the computing platform may receive a first validation key for the first data block calculated from contents of the first data block. Then, the computing platform may store the first data block and the first validation key for the first data block in a blockchain associated with the data management computing platform. Next, the computing platform may send the first validation key for the first data block to a data escrow database system, which may cause the data escrow database system to store the first validation key in a validation keys database.

15 Claims, 18 Drawing Sheets

Related U.S. Application Data

(60) Provisional application No. 62/778,510, filed on Dec. 12, 2018.

(58) Field of Classification Search
CPC ...... G06F 11/3476; G06F 17/40; G06F 16/23; G06F 16/25; G06F 11/14; G06F 11/2205; G06F 3/00; H04L 9/0894; H04L 9/3239; H04L 9/50; G05B 23/02
See application file for complete search history.

(56) References Cited

U.S. PATENT DOCUMENTS

| | | | |
|---|---|---|---|
| 2014/0289875 A1 | 9/2014 | Knafel | |
| 2015/0074401 A1* | 3/2015 | D'Souza | H04L 9/0825 713/168 |
| 2015/0332283 A1 | 11/2015 | Witchey | |
| 2016/0260169 A1* | 9/2016 | Arnold | G06Q 20/381 |
| 2017/0234709 A1 | 8/2017 | Mackie et al. | |
| 2018/0046766 A1 | 2/2018 | Deonarine et al. | |
| 2018/0082043 A1 | 3/2018 | Witchey et al. | |
| 2018/0130050 A1 | 5/2018 | Taylor et al. | |
| 2018/0225424 A1 | 8/2018 | Kaditz et al. | |
| 2018/0374283 A1* | 12/2018 | Pickover | G07C 5/12 |
| 2020/0192885 A1* | 6/2020 | Grandau | G06F 16/215 |
| 2020/0327230 A1* | 10/2020 | Bitauld | G06F 21/57 |
| 2021/0297265 A1* | 9/2021 | Huang | G06F 16/2379 |
| 2021/0342836 A1* | 11/2021 | Cella | H04L 9/3239 |

OTHER PUBLICATIONS

Dai, Hao, et al., "TrialChain: A Blockchain-Based Platform to Validate Data Integrity in Large, Biomedical Research Studies," Jul. 10, 2018.
https://www.rdmag.com/article/2018/07/blockchain-audit-trail-comes-pharma dated Sep. 14, 2018.
https://cryptocoinpravda.com/medical-devices-on-the-blockchain-medxchange-io.html dated Sep. 14, 2018.
Mamoshina et al. "Converging blockchain and next generation artificial intelligence technologies to decentralize and accelerate biomedical research and healthcare" Oncotarget, 2018, vol. 9, No. 5, pp. 5665-5690.
Feb. 24, 2020 (WO) International Search Report—PCT/US19/065717.

* cited by examiner

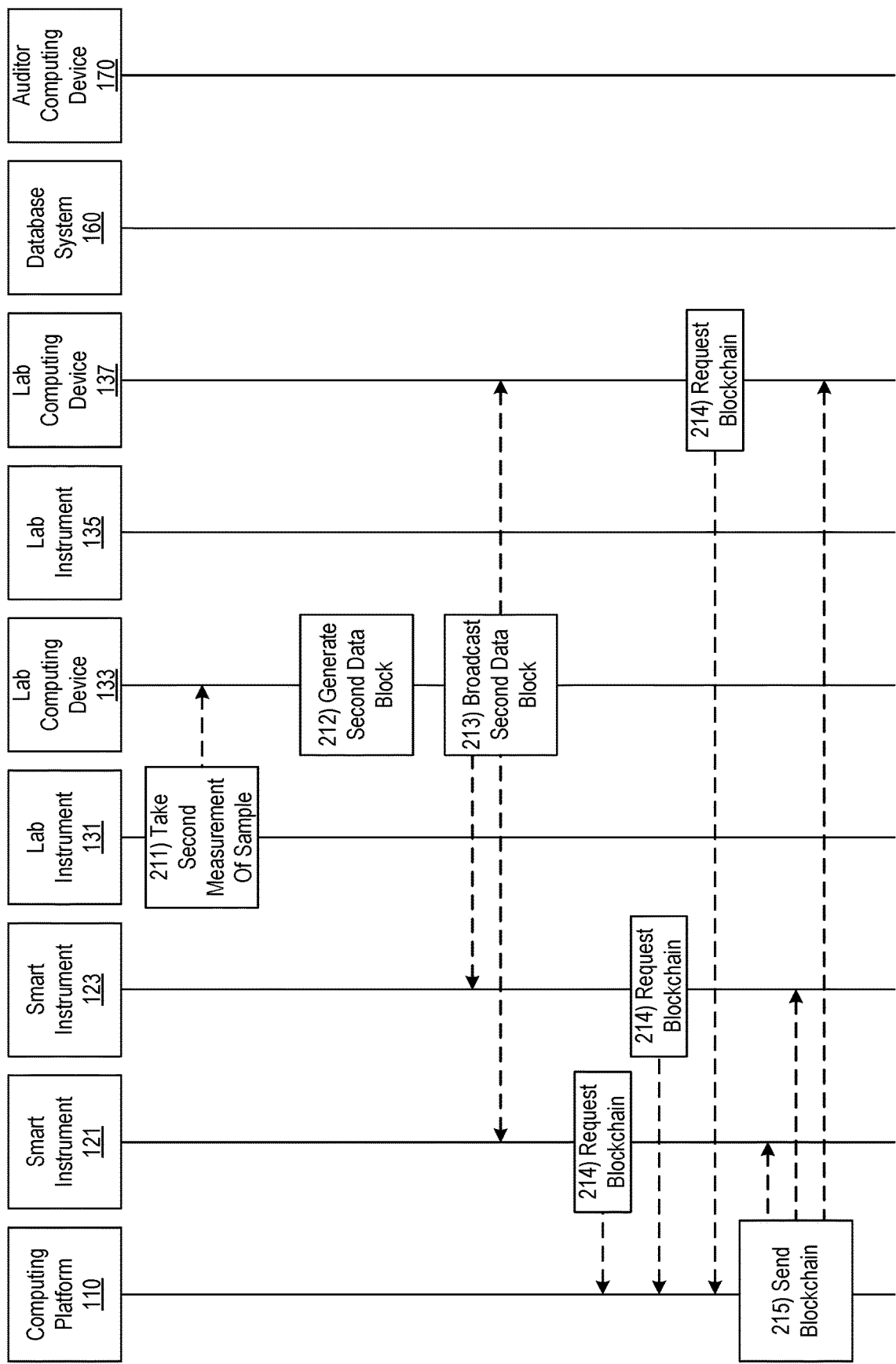

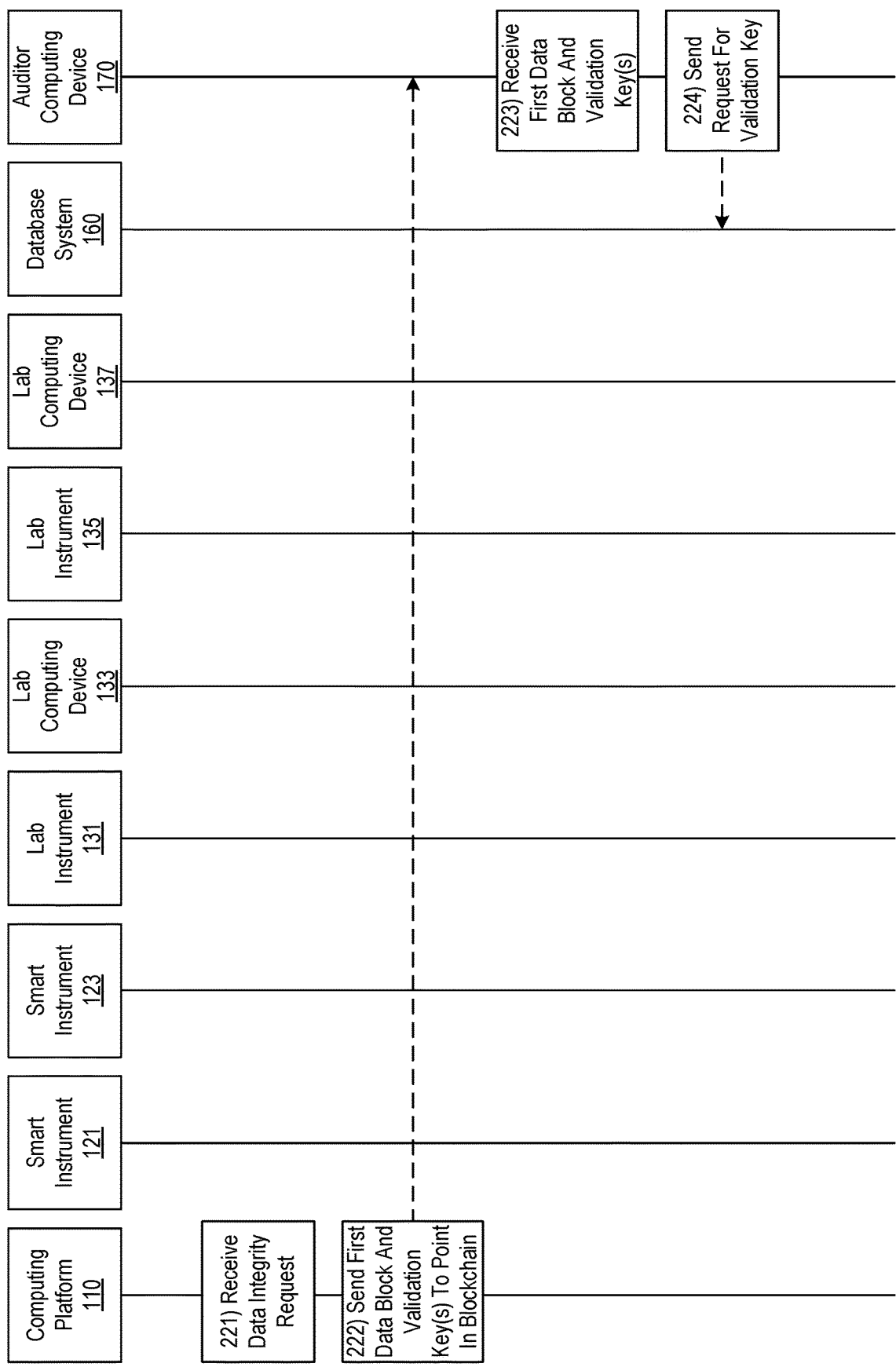

UTILIZING INDEPENDENTLY STORED VALIDATION KEYS TO ENABLE AUDITING OF INSTRUMENT MEASUREMENT DATA MAINTAINED IN A BLOCKCHAIN

RELATED APPLICATION DATA

This application is a continuation of U.S. Ser. No. 16/710,003, filed on Dec. 11, 2019, now U.S. Pat. No. 11,321,305, which claims priority to U.S. Provisional Patent Application No. 62/778,510, filed on Dec. 12, 2018, the contents of which are hereby incorporated herein by reference in their entireties for all purposes.

BACKGROUND

Aspects of the disclosure relate to data processing, measurement and testing systems, and distributed data storage and verification. In particular, one or more aspects of the disclosure relate to utilizing independently stored validation keys to enable auditing of instrument measurement data maintained in a blockchain.

As new computing technologies are developed and adopted, ever growing amounts and types of information are stored electronically. This trend exists in laboratory environments where physical samples are measured and tested using various instruments. As data is obtained from these instruments and other sources and stored for analysis and other purposes, it may be critically important for laboratory researchers and other entities to maintain, ensure, and attest to the validity and integrity of such data. In some instances, however, it may be difficult to maintain, ensure, and attest to the integrity of this data while also ensuring the privacy and/or secrecy of certain portions of the data, especially in instances where some portions must be shared for verification while other portions must remain private and/or otherwise secret. Further still, it may be difficult to optimize the usage of processing power, the usage of network bandwidth, and/or the consumption of other computing resources on the part of the computer systems and networks that store, interact with, and/or otherwise utilize this data.

SUMMARY

Aspects of the disclosure provide effective, efficient, scalable, and convenient technical solutions that address and overcome the technical problems associated with maintaining, ensuring, and attesting to the integrity of instrument measurement data by utilizing independently stored validation keys to enable auditing of instrument measurement data maintained in a blockchain.

In accordance with one or more embodiments, a data management computing platform having at least one processor, a communication interface, and memory may receive, via the communication interface, from a first block generator, a first data block comprising first measurement data captured by a first instrument and associated with a sample. Subsequently, the data management computing platform may receive a first validation key for the first data block calculated from contents of the first data block. Then, the data management computing platform may store the first data block and the first validation key for the first data block in a blockchain associated with the data management computing platform. Thereafter, the data management computing platform may send, via the communication interface, to a data escrow database system, the first validation key for the first data block. In addition, by sending the first valida-tion key for the first data block to the data escrow database system, the data management computing platform may cause the data escrow database system to store the first validation key in a validation keys database maintained by the data escrow database system.

In some embodiments, receiving the first data block from the first block generator may include receiving the first data block from a first smart instrument that captured the first measurement data and generated the first data block. In some embodiments, receiving the first data block from the first block generator may include receiving the first data block from a first lab computing device that generated the first data block using information received from a linked instrument. In some embodiments, the first data block received from the first block generator may include a unique identifier corresponding to the sample.

In some embodiments, receiving the first validation key for the first data block may include receiving the first validation key for the first data block from one or more block generators that calculated the first validation key for the first data block using at least one validation key corresponding to at least one previous block in the blockchain associated with the data management computing platform.

In some embodiments, storing the first data block and the first validation key for the first data block in the blockchain associated with the data management computing platform may include storing the first data block and the first validation key for the first data block in the blockchain associated with the data management computing platform in response to receiving, from one or more additional block generators different from the first block generator, a validation message comprising information validating the first data block. In some embodiments, receiving the validation message from the one or more additional block generators may include receiving the validation message from a smart instrument. In some embodiments, receiving the validation message from the one or more additional block generators may include receiving the validation message from a lab computing device.

In some embodiments, storing the first data block and the first validation key for the first data block in the blockchain associated with the data management computing platform may include storing the first data block and the first validation key for the first data block in a blockchain database maintained by the data management computing platform.

In some embodiments, an auditor computing device may be configured to verify integrity of blockchain data associated with the blockchain using validation keys stored in the validation keys database maintained by the data escrow database system.

In some embodiments, an auditor computing device may be configured to verify integrity of the first data block based on receiving a request comprising the first validation key from the first block generator.

In some embodiments, the data management computing platform may receive, via the communication interface, from a second block generator, a second data block comprising second measurement data captured by a second instrument and associated with the sample. Subsequently, the data management computing platform may receive a second validation key for the second data block calculated from contents of the second data block. Then, the data management computing platform may store the second data block and the second validation key for the second data block in the blockchain associated with the data management computing platform. Thereafter, the data management computing platform may send, via the communication interface, to the data escrow database system, the second validation key for the second data block. In addition, by sending the second validation key for the second data block to the data escrow database system, the data management computing platform may cause the data escrow database system to store the second validation key in the validation keys database maintained by the data escrow database system.

In some embodiments, receiving the second data block from the second block generator may include receiving the second data block from a second smart instrument that captured the second measurement data and generated the second data block. In some embodiments, receiving the second data block from the second block generator may include receiving the second data block from a second lab computing device that generated the second data block using information received from a linked instrument.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for utilizing independently stored validation keys to enable auditing of instrument measurement data maintained in a blockchain in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

One or more aspects of the disclosure relate to utilizing independently stored validation keys to enable auditing of instrument measurement data maintained in a blockchain. For example, some lab scientists and other associated entities may collect data from instruments when measuring various samples in a lab. In some instances, these lab scientists and other associated entities may be responsible for creating a chain of custody for the data and/or the corresponding sample. These processes may be prone to human error and other challenges. As illustrated below, one or more aspects of the disclosure provide ways of using laboratory instruments to automatically create a secure immutable log of events that follow a sample through its life, thereby creating a certifiable chain of custody. As illustrated below, a network of instruments in a lab may, in some instances, be used to generate an audit-able log of what is done to a sample by using one or more blockchains. In some instances, smart block generator instruments may be used to ensure that the log cannot be tampered with and is independent of any person as being a key generator and/or holder. The log that is produced may, for instance, provide a full record of what was done to a sample. In addition, and as described in detail below, substantive data from the full blockchain may, for instance, be verified by comparing one or more blocks from the chain with a separate chain of validation keys that is stored independently from the full blockchain, unlike conventional blockchains.

Figure 1A:
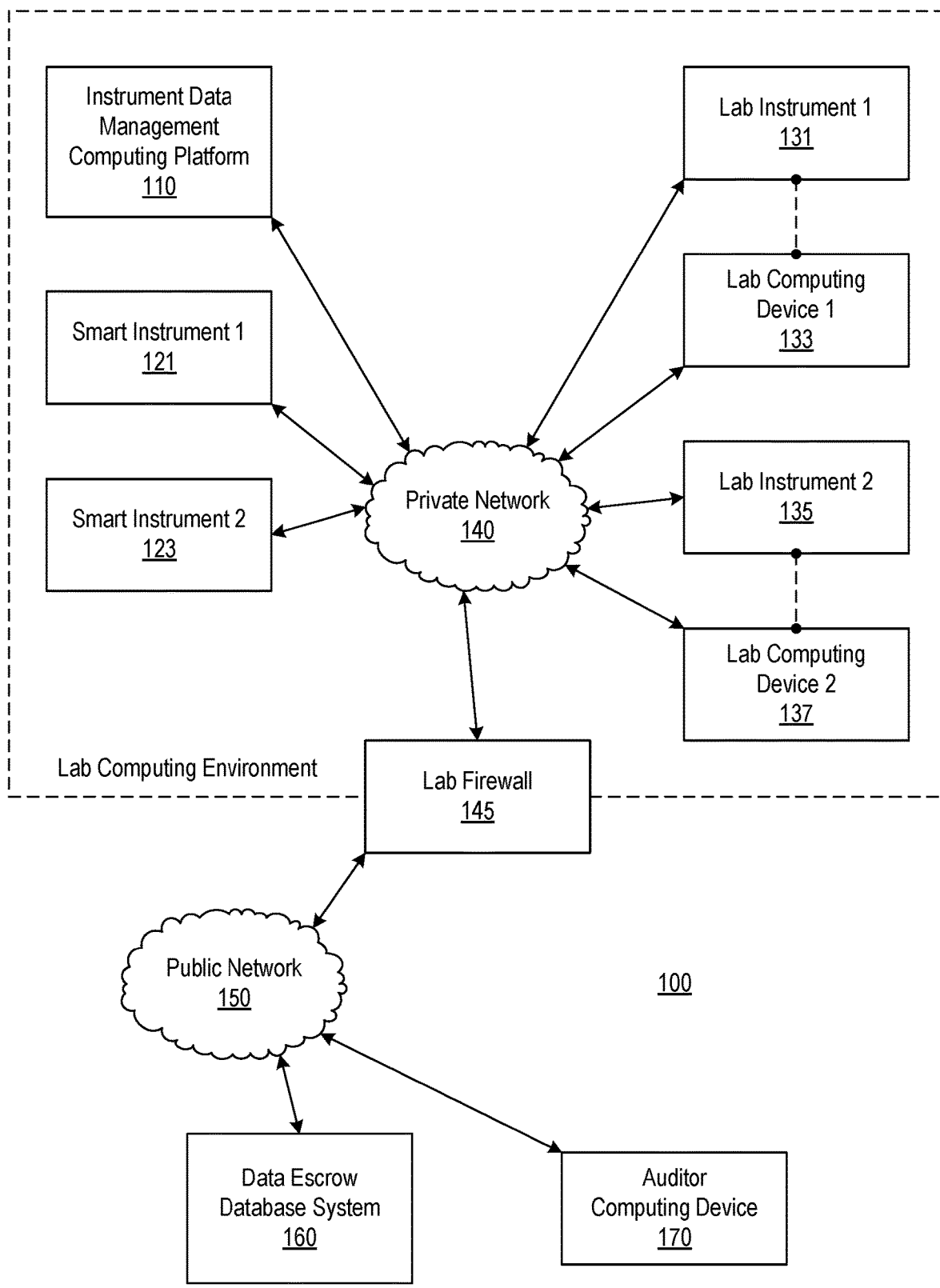
FIGS. 1A, 1B, and 1C depict an illustrative computing environment for utilizing independently stored validation keys to enable auditing of instrument measurement data maintained in a blockchain in accordance with one or more example embodiments.
Figure 1B:
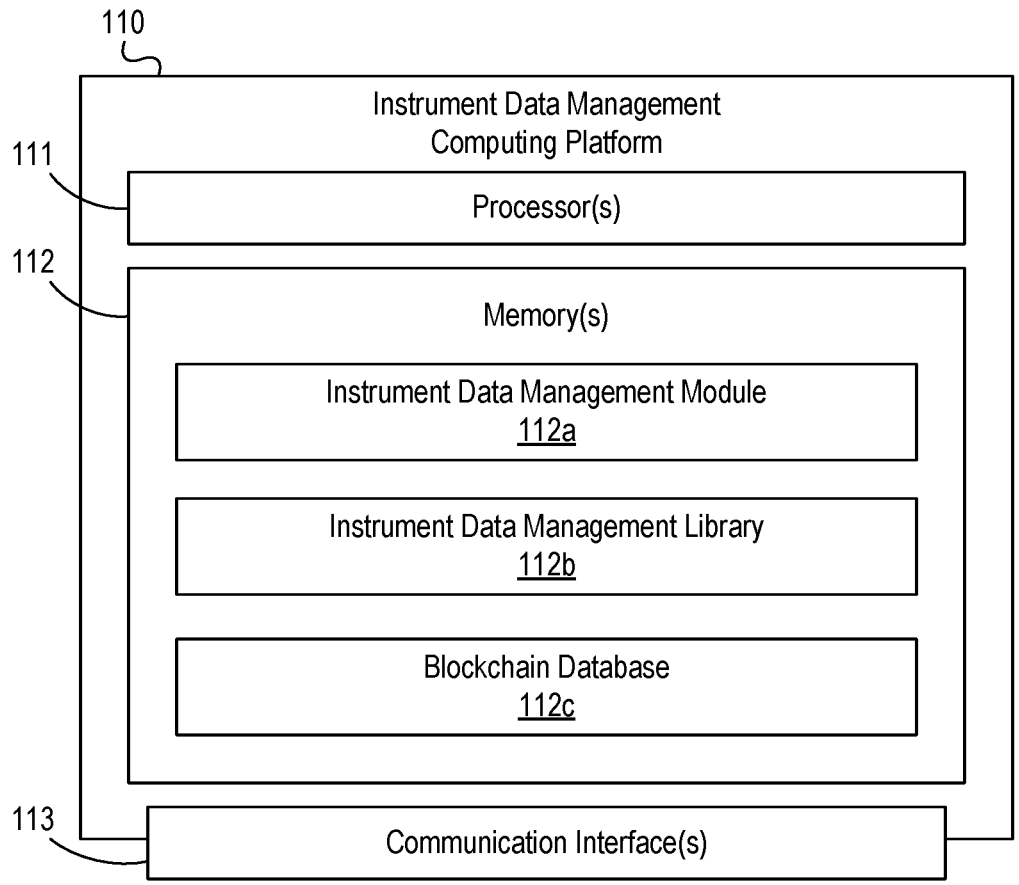
Figure 1C:
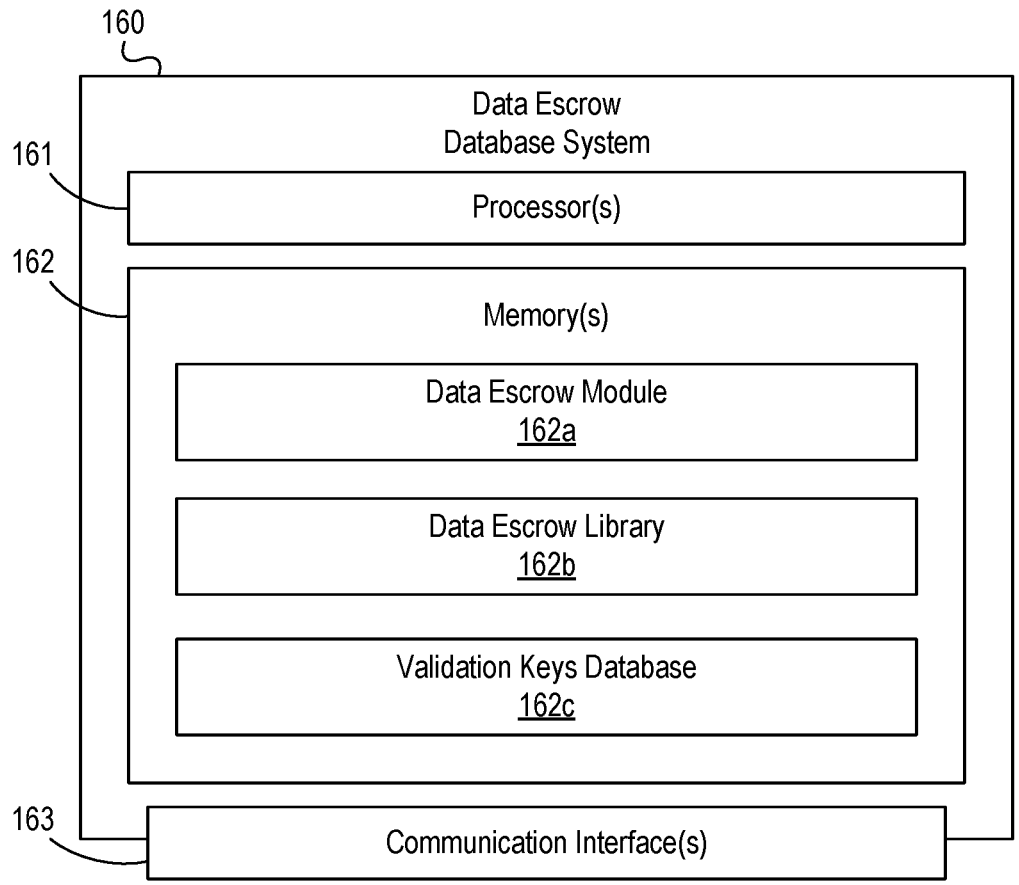

FIGS. 1A, 1B, and 1C depict an illustrative computing environment for utilizing independently stored validation keys to enable auditing of instrument measurement data maintained in a blockchain in accordance with one or more example embodiments. Referring to FIG. 1A, computing environment 100 may include one or more computer systems, one or more measurement instruments, and/or one or more other devices. For example, computing environment 100 may include an instrument data management computing platform 110, a first smart instrument 121, a second smart instrument 123, a first lab instrument 131, a first lab computing device 133, a second lab instrument 135, a second lab computing device 137, an lab firewall 145, a data escrow database system 160, and an auditor computing device 170.

As illustrated in greater detail below, instrument data management computing platform 110 may include one or more computing devices configured to perform one or more of the functions described herein. For example, instrument data management computing platform 110 may include one or more computers (e.g., servers, server blades, or the like).

Smart instrument 121 may be a laboratory instrument that includes one or more computing devices. Smart instrument 121 may be configured to take and/or otherwise capture measurements from a sample in a lab and subsequently generate and send one or more data blocks to other computing devices in computing environment 100 based on such measurements. Smart instrument 123 also may be a laboratory instrument that includes one or more computing devices. Smart instrument 123 similarly may be configured to take and/or otherwise capture measurements from a sample in a lab and subsequently generate and send one or more data blocks to other computing devices in computing environment 100 based on such measurements.

Lab instrument 131 may be a laboratory instrument that might not include one or more computing devices. Lab instrument 131 may be configured to take and/or otherwise capture measurements from a sample in a lab and subsequently may communicate data associated with such measurements to lab computing device 133. Lab computing device 133 may include one or more computing devices and/or other computer components (e.g., processors, memories, communication interfaces). In addition, lab computing device 133 may be configured to generate and send one or more data blocks to other computing devices in computing environment 100 based on data received from lab instrument 131.

Lab instrument 135 also may be a laboratory instrument that might not include one or more computing devices. Lab instrument 135 may be configured to take and/or otherwise capture measurements from a sample in a lab and subsequently may communicate data associated with such measurements to lab computing device 137. Lab computing device 137 may include one or more computing devices and/or other computer components (e.g., processors, memories, communication interfaces). In addition, lab computing device 137 may be configured to generate and send one or more data blocks to other computing devices in computing environment 100 based on data received from lab instrument 135.

Lab firewall 145 may include one or more computing devices and/or other computer components (e.g., processors, memories, communication interfaces). In addition, lab firewall 145 may be configured to encrypt and/or otherwise protect one or more computing devices and/or other devices operating in a lab computing environment (e.g., instrument data management computing platform 110, smart instrument 121, smart instrument 123, lab instrument 131, lab computing device 133, lab instrument 135, lab computing device 137).

Data escrow database system 160 may include one or more computing devices configured to perform one or more data escrow functions and/or other functions described herein, as described below. For example, data escrow database system 160 may include one or more computers (e.g., servers, server blades, or the like).

Auditor computing device 170 may be a personal computing device (e.g., desktop computer, laptop computer) or mobile computing device (e.g., smartphone, tablet) that may be linked to and/or used by an auditor user. For instance, auditor computing device 170 may be used to verify integrity and/or otherwise audit instrument measurement data maintained in a blockchain associated with instrument data management computing platform 110 using validation keys that may be independently stored by data escrow database system 160, as illustrated in greater detail below.

Computing environment 100 also may include one or more networks, which may interconnect one or more of instrument data management computing platform 110, smart instrument 121, smart instrument 123, lab instrument 131, lab computing device 133, lab instrument 135, lab computing device 137, lab firewall 145, data escrow database system 160, and auditor computing device 170. For example, computing environment 100 may include a private network 140, which may interconnect computing devices and/or other devices operating in a lab computing environment (e.g., instrument data management computing platform 110, smart instrument 121, smart instrument 123, lab instrument 131, lab computing device 133, lab instrument 135, lab computing device 137). In addition, computing environment 100 may include a public network 150, which may interconnect computing devices and/or other devices operating in the lab computing environment with one or more systems outside of the lab computing environment (e.g., data escrow database system 160, auditor computing device 170) via one or more firewalls (e.g., lab firewall 145).

In one or more arrangements, lab computing device 133, lab computing device 137, auditor computing device 170, and/or the other systems included in computing environment 100 may be any type of computing device capable of receiving a user interface, receiving input via the user interface, and communicating the received input to one or more other computing devices. For example, lab computing device 133, lab computing device 137, auditor computing device 170, and/or the other systems included in computing environment 100 may, in some instances, be and/or include desktop computers, laptop computers, tablet computers, smart phones, or the like that may include one or more processors, memories, communication interfaces, storage devices, and/or other components. As noted above, and as illustrated in greater detail below, any and/or all of instrument data management computing platform 110, smart instrument 121, smart instrument 123, lab computing device 133, lab computing device 137, lab firewall 145, data escrow database system 160, and auditor computing device 170 may, in some instances, be special-purpose computing devices configured to perform specific functions.

Referring to FIG. 1B, instrument data management computing platform 110 may include at least one processor 111, memory 112, and communication interface 113. A data bus may interconnect processor 111, memory 112, and communication interface 113. Communication interface 113 may be a network interface configured to support communication between instrument data management computing platform 110 and one or more networks (e.g., network 140, network 150, or the like). Memory 112 may include one or more program modules having instructions that when executed by processor 111 cause instrument data management computing platform 110 to perform one or more functions described herein. In addition, memory 112 may include one or more libraries and/or databases that may store and/or otherwise maintain information which may be used by such program modules and/or processor 111. In some instances, the one or more program modules and/or databases may be stored by and/or maintained in different memory units of instrument data management computing platform 110 and/or by different computing devices that may form and/or otherwise make up instrument data management computing platform 110. For example, memory 112 may have, store, and/or include an instrument data management module 112a, an instrument data management library 112b, and a blockchain database 112c. Instrument data management module 112a may have instructions that direct and/or cause instrument data management computing platform 110 to store validation keys that enable auditing of instrument measurement data maintained in a blockchain and/or to perform other functions, as discussed in greater detail below. Instrument data management library 112b may store information used by instrument data management module 112a and/or instrument data management computing platform 110 in storing validation keys that enable auditing of instrument measurement data maintained in a blockchain and/or in performing other functions. Blockchain database 112c may store data associated with a blockchain maintained by instrument data management computing platform 110. As illustrated below, the data stored by instrument data management computing platform 110 in blockchain database 112c may include measurement data captured from one or more instruments (e.g., smart instrument 121, smart instrument 123, lab instrument 131, lab instrument 135) as well as validation keys that are calculated based on data blocks received from block generators (e.g., smart instrument 121, smart instrument 123, lab computing device 133, lab computing device 137) in computing environment 100.

Referring to FIG. 1C, data escrow database system 160 may include at least one processor 161, memory 162, and communication interface 163. A data bus may interconnect processor 161, memory 162, and communication interface 163. Communication interface 163 may be a network interface configured to support communication between data escrow database system 160 and one or more networks (e.g., network 140, network 150, or the like). Memory 162 may include one or more program modules having instructions that when executed by processor 161 cause data escrow database system 160 to perform one or more functions described herein. In addition, memory 162 may include one or more libraries and/or databases that may store and/or otherwise maintain information which may be used by such program modules and/or processor 161. In some instances, the one or more program modules and/or databases may be stored by and/or maintained in different memory units of data escrow database system 160 and/or by different computing devices that may form and/or otherwise make up data escrow database system 160. For example, memory 162 may have, store, and/or include a data escrow module 162a, a data escrow library 162b, and a validation keys database 162c. Data escrow module 162a may have instructions that direct and/or cause data escrow database system 160 to receive and store validation keys in one or more chains (e.g., so as to enable auditing of instrument measurement data maintained in one or more separate blockchains) and/or to perform other functions, as discussed in greater detail below. Data escrow library 162b may store information used by data escrow module 162a and/or data escrow database system 160 in receiving and storing validation keys and/or in performing other functions. Validation keys database 162c may store one or more validation keys (which may, e.g., be associated with a blockchain maintained by instrument data management computing platform 110). As illustrated below, the data stored by data escrow database system 160 in validation keys database 162c might not include measurement data captured from one or more instruments (e.g., smart instrument 121, smart instrument 123, lab instrument 131, lab instrument 135) and instead might only include validation keys that are calculated by instrument data management computing platform 110 based on data blocks received from block generators (e.g., smart instrument 121, smart instrument 123, lab computing device 133, lab computing device 137) in computing environment 100.

Figure 2A:
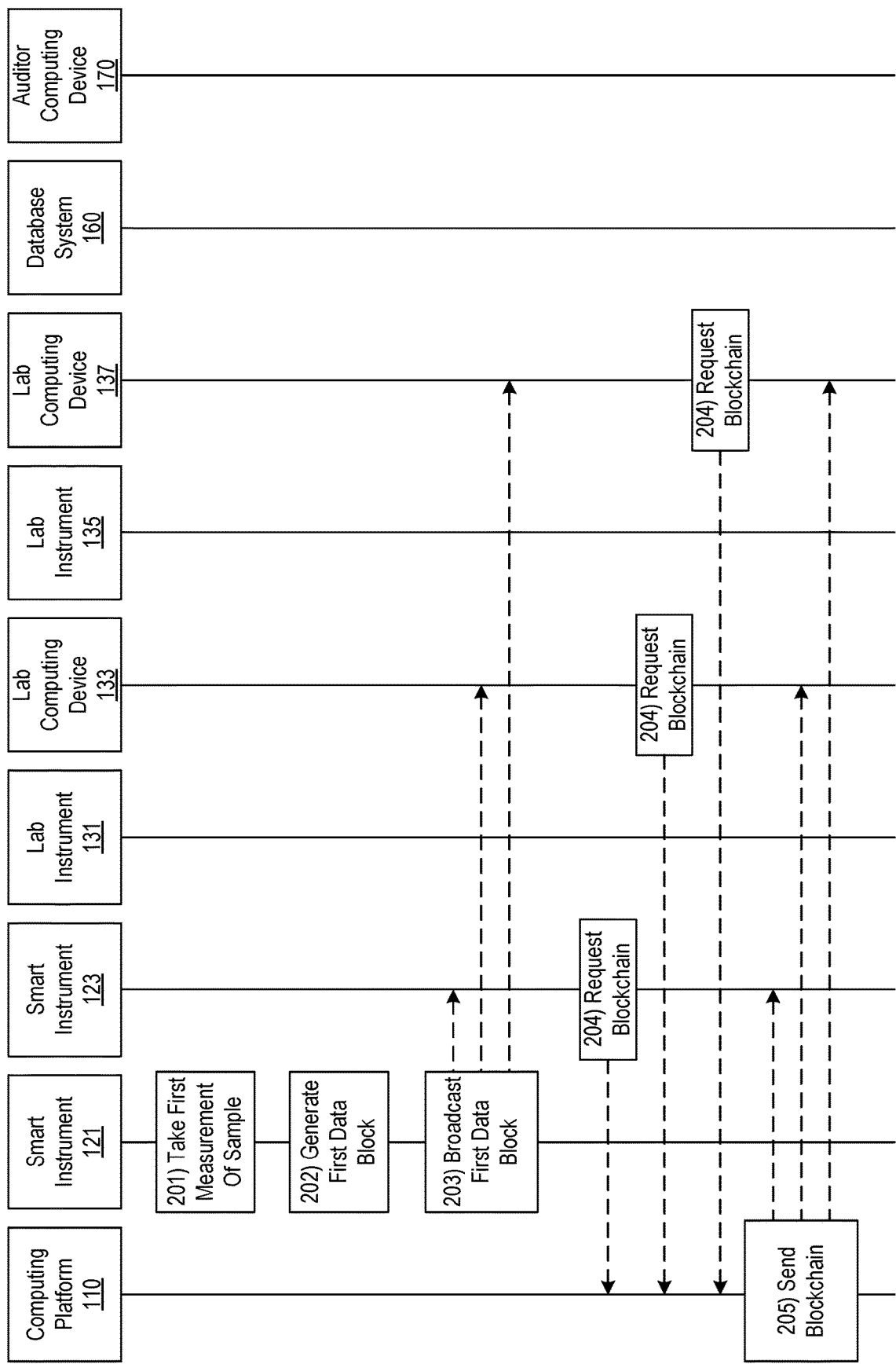

FIGS. 2A-2F depict an illustrative event sequence for utilizing independently stored validation keys to enable auditing of instrument measurement data maintained in a blockchain in accordance with one or more example embodiments. Referring to FIG. 2A, at step 201, smart instrument 121 may take a first measurement of a sample. For instance, smart instrument 121 may capture measurement data associated with a particular physical sample being evaluated in a lab. At step 202, smart instrument 121 may generate a first data block based on the measurement data captured by smart instrument 121 when taking the first measurement of the sample. The first data block generated by smart instrument 121 may, for instance, include the measurement data captured by smart instrument 121, one or more keys calculated by smart instrument 121, and/or other data generated and/or captured by smart instrument 121 (e.g., a unique identifier associated with the sample, a timestamp identifying when the measurement of the sample was taken, etc.).

At step 203, smart instrument 121 may broadcast the first data block to one or more other systems and/or devices (which may, e.g., also be included in the lab computing environment). For example, at step 203, smart instrument 121 may broadcast the first data block to smart instrument 123, lab computing device 133, and/or lab computing device 137 (e.g., by sending, transmitting, and/or otherwise communicating the first data block to instrument data management computing platform 110, smart instrument 123, lab computing device 133, and/or lab computing device 137). At step 204, smart instrument 123, lab computing device 133, and/or lab computing device 137 may request blockchain data from instrument data management computing platform 110. For instance, smart instrument 123, lab computing device 133, and/or lab computing device 137 may request part and/or all of a blockchain maintained by instrument data management computing platform 110 in which measurement data and one or more validation keys are stored. At step 205, instrument data management computing platform 110 may send blockchain data to smart instrument 123, lab computing device 133, and/or lab computing device 137. For example, at step 205, instrument data management computing platform 110 may send information associated with one or more portions of and/or all of a blockchain maintained by instrument data management computing platform 110 in which measurement data and one or more validation keys are stored (e.g., in response to receiving the request(s) from smart instrument 123, lab computing device 133, and/or lab computing device 137).

Figure 2B:
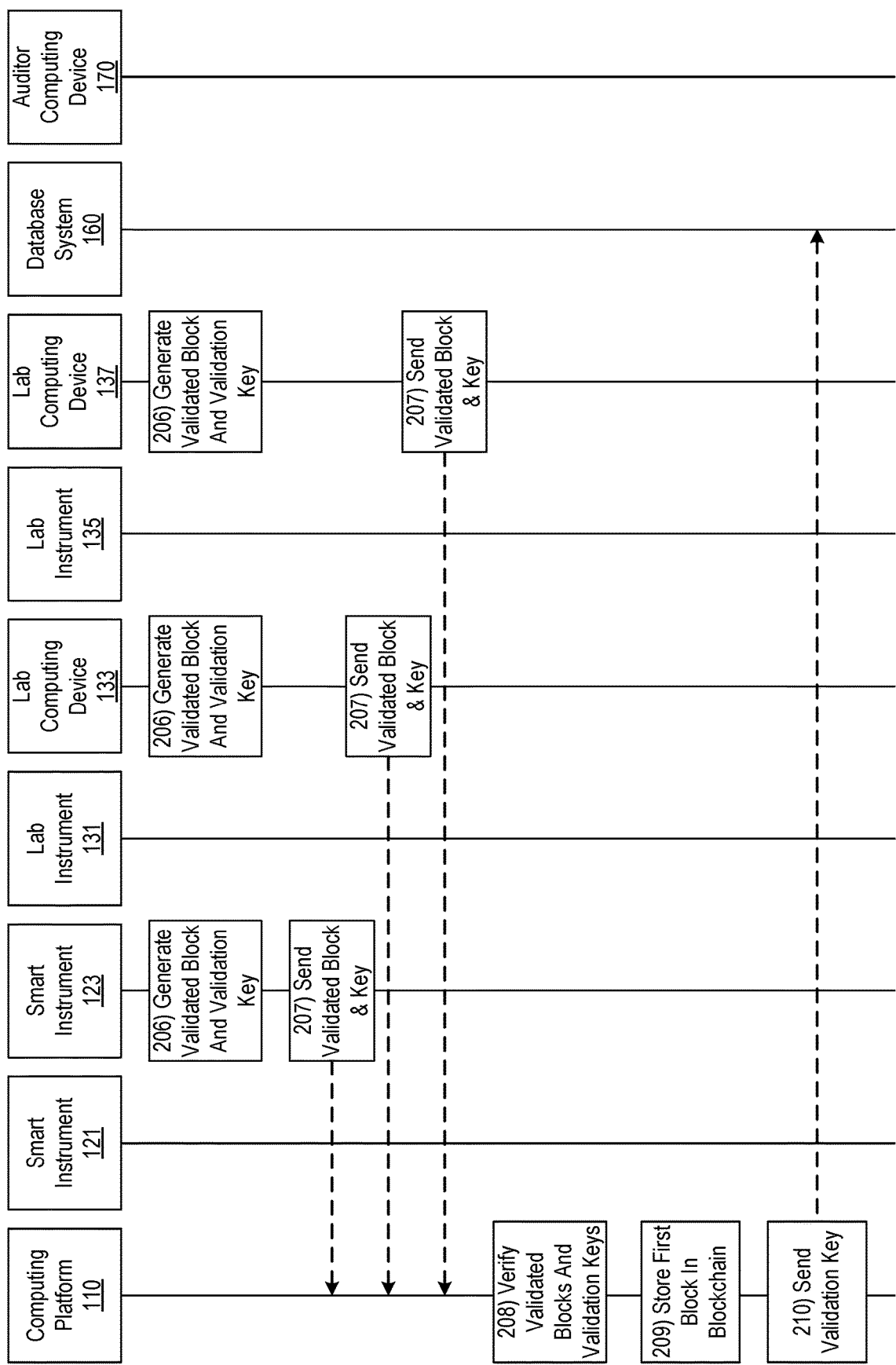

Referring to FIG. 2B, at step 206, smart instrument 123, lab computing device 133, and/or lab computing device 137 may generate a validated data block and a validation key (e.g., based on the first data block broadcast by and received from smart instrument 121 at step 203 and further based on the blockchain data received from instrument data management computing platform 110 at step 205). For instance, at step 206, smart instrument 123, lab computing device 133, and/or lab computing device 137 may calculate one or more validation keys from the contents of the first data block received from smart instrument 121 and from the blockchain data received from instrument data management computing platform 110.

At step 207, smart instrument 123, lab computing device 133, and/or lab computing device 137 may send the validated data block and the validation key to instrument data management computing platform 110. For example, at step 207, smart instrument 123, lab computing device 133, and/or lab computing device 137 may generate and send one or more validation messages to instrument data management computing platform 110 and/or to one or more other systems and/or devices (which may, e.g., also be included in the lab computing environment, such as smart instrument 123, lab computing device 133, and/or lab computing device 137). In some instances, smart instrument 123, lab computing device 133, and/or lab computing device 137 also may store the validated data block associated with the data received from smart instrument 121 and/or the calculated validation key associated with the data received from smart instrument 121 (e.g., in one or more blockchains being maintained by the respective instrument or device).

At step 208, instrument data management computing platform 110 may receive the validated data block(s) and the validation key(s) from smart instrument 123, lab computing device 133, and/or lab computing device 137 and may verify the validated data block(s) and the validation key(s) received from smart instrument 123, lab computing device 133, and/or lab computing device 137. For example, at step 208, instrument data management computing platform 110 may receive the first data block (e.g., from smart instrument 121) after the first data block has been broadcast to, validated by, and/or sent to instrument data management computing platform 110 via one or more of smart instrument 123, lab computing device 133, and/or lab computing device 137. For instance, instrument data management computing platform 110 may receive, via the communication interface (e.g., communication interface 113), from a first block generator (e.g., smart instrument 121), a first data block comprising first measurement data captured by a first instrument (e.g., smart instrument 121) and associated with a sample. In some instances, instrument data management computing platform 110 also may receive the first data block and/or one or more validation messages from one or more other systems and/or devices (which may, e.g., also be included in the lab computing environment, such as smart instrument 123, lab computing device 133, and/or lab computing device 137, and which also may maintain their own, independent, individual copies of the blockchain that is also maintained by instrument data management computing platform 110).

In some embodiments, receiving the first data block from the first block generator may include receiving the first data block from a first smart instrument that captured the first measurement data and generated the first data block. For example, in some instances, in receiving the first data block from the first block generator at step 208, instrument data management computing platform 110 may receive the first data block from a first smart instrument (e.g., smart instrument 121) that captured the first measurement data and generated the first data block.

In some embodiments, receiving the first data block from the first block generator may include receiving the first data block from a first lab computing device that generated the first data block using information received from a linked instrument. For example, in some instances, in receiving the first data block from the first block generator at step 208, instrument data management computing platform 110 may receive the first data block from a first lab computing device (e.g., lab computing device 133) that generated the first data block using information received from a linked instrument (e.g., lab instrument 131).

In some embodiments, the first data block received from the first block generator may include a unique identifier corresponding to the sample. For example, in some instances, the first data block received by instrument data management computing platform 110 at step 208 from the first block generator may include a unique identifier corresponding to the sample. Such an identifier may be a unique string of numbers, letters, and/or other characters that are linked to the sample and allow the sample to be identified from other samples that may be analyzed in the lab.

In addition, at step 208, instrument data management computing platform 110 may receive and verify a validation key for the first data block. For example, at step 208, instrument data management computing platform 110 may receive a first validation key for the first data block calculated from contents of the first data block. For instance, instrument data management computing platform 110 may receive the first validation key from one or more of smart instrument 123, lab computing device 133, and/or lab computing device 137, which may calculate the first validation key using one or more predefined key calculation algorithms that utilize the contents of the first data block as arguments and/or other input values. Additionally or alternatively, instrument data management computing platform 110 may verify the first validation key by calculating the first validation key (e.g., based on the contents of the data block and/or one or more previous data blocks and/or validation keys). For instance, instrument data management computing platform 110 may verify the first validation key by calculating the first validation key using one or more predefined key calculation algorithms that utilize the contents of the first data block as arguments and/or other input values.

In some embodiments, receiving the first validation key for the first data block comprises receiving the first validation key for the first data block from one or more block generators that calculated the first validation key for the first data block using at least one validation key corresponding to at least one previous block in the blockchain associated with the data management computing platform. For example, in some instances, in receiving the first validation key for the first data block, instrument data management computing platform 110 may receive the first validation key for the first data block from one or more block generators (e.g., smart instrument 123, lab computing device 133, lab computing device 137) that calculated the first validation key for the first data block using at least one validation key corresponding to at least one previous block in the blockchain associated with the data management computing platform (e.g., instrument data management computing platform 110). For instance, smart instrument 123, lab computing device 133, and/or lab computing device 137 may use at least one validation key corresponding to at least one previous block as an argument and/or other input value to the one or more predefined key calculation algorithms.

At step 209, instrument data management computing platform 110 may store the first data block in a blockchain. For example, at step 209, instrument data management computing platform 110 may store the first data block and the first validation key for the first data block in a blockchain associated with the data management computing platform (e.g., instrument data management computing platform 110). For instance, instrument data management computing platform 110 may store the first data block and the first validation key for the first data block in a copy of the blockchain maintained by instrument data management computing platform 110 in blockchain database 112c.

In some embodiments, storing the first data block and the first validation key for the first data block in the blockchain associated with the data management computing platform may include storing the first data block and the first validation key for the first data block in the blockchain associated with the data management computing platform in response to receiving, from one or more additional block generators different from the first block generator, a validation message comprising information validating the first data block. For example, in storing the first data block and the first validation key for the first data block in the blockchain associated with the data management computing platform (e.g., instrument data management computing platform 110) at step 209, instrument data management computing platform 110 may store the first data block and the first validation key for the first data block in the blockchain associated with the data management computing platform (e.g., instrument data management computing platform 110) in response to receiving, from one or more additional block generators (e.g., smart instrument 123, lab computing device 133, lab computing device 137) different from the first block generator (e.g., smart instrument 121), a validation message comprising information validating the first data block. For instance, instrument data management computing platform 110 might wait to store the first data block in the blockchain until instrument data management computing platform 110 receives a predetermined number of validation messages from one or more other systems and/or devices associated with the blockchain (e.g., other block generators such as smart instrument 123, lab computing device 133, lab computing device 137, etc.). Each validation message may, for instance, be provided by a different block generator in the lab computing environment, and each validation message may, for instance, include the same validation key calculated by instrument data management computing platform 110 (e.g., because each block generator may generate the validation key based on the same data block contents).

In some embodiments, receiving the validation message from the one or more additional block generators may include receiving the validation message from a smart instrument. For example, in receiving the validation message from the one or more additional block generators, instrument data management computing platform 110 may receive the validation message from a smart instrument (e.g., smart instrument 123). In some embodiments, receiving the validation message from the one or more additional block generators may include receiving the validation message from a lab computing device. For example, in receiving the validation message from the one or more additional block generators, instrument data management computing platform 110 may receive the validation message from a lab computing device (e.g., lab computing device 133, lab computing device 137).

In some embodiments, storing the first data block and the first validation key for the first data block in the blockchain associated with the data management computing platform may include storing the first data block and the first validation key for the first data block in a blockchain database maintained by the data management computing platform. For example, in storing the first data block and the first validation key for the first data block in the blockchain associated with the data management computing platform (e.g., instrument data management computing platform 110) at step 209, instrument data management computing platform 110 may store the first data block and the first validation key for the first data block in a blockchain database (e.g., blockchain database 112c) maintained by the data management computing platform (e.g., instrument data management computing platform 110). For instance, instrument data management computing platform 110 may store the first data block and the first validation key for the first data block in a copy of the blockchain maintained by instrument data management computing platform 110 in blockchain database 112c.

At step 210, instrument data management computing platform 110 may send the validation key to data escrow database system 160. For example, at step 210, instrument data management computing platform 110 may send, via the communication interface (e.g., communication interface 113), to a data escrow database system (e.g., data escrow database system 160), the first validation key for the first data block. In addition, by sending the first validation key for the first data block to the data escrow database system (e.g., data escrow database system 160), instrument data management computing platform 110 may cause the data escrow database system (e.g., data escrow database system 160) to store the first validation key in a validation keys database (e.g., validation keys database 162c) maintained by the data escrow database system (e.g., data escrow database system 160). In particular, data escrow database system 160 may store and/or otherwise maintain a chain of validation keys that corresponds in sequence to the data blocks of the blockchain maintained by instrument data management computing platform 110. Instrument data management computing platform 110 thus may trigger data escrow database system 160 to add another element—i.e., the first validation key corresponding to the first data block—to the sequential chain of validation keys maintained by data escrow database system 160 in validation keys database 162c. As illustrated below, this may enable instrument measurement data contained in the first data block and maintained in the blockchain by instrument data management computing platform 110 to be audited by a third party, as a lab researcher or other entity with access rights to the first data block might be able to provide the first validation key to an auditor, who can then verify the validation key with data escrow database system 160. In addition, this auditing may occur while maintaining the privacy and secrecy of the measurement data included in the first data block, because only the first validation key—and not the contents of the data block itself—may be sent to data escrow database system 160 by instrument data management computing platform 110.

Referring to FIG. 2C, at step 211, lab instrument 131 may take a second measurement of a sample. For instance, lab instrument 131 may capture measurement data associated with the same physical sample being evaluated in the lab in the examples described above. At step 212, lab computing device 133 may generate a second data block based on the measurement data captured by lab instrument 131 when taking the second measurement of the sample. The second data block generated by lab computing device 133 may, for instance, include the measurement data captured by lab instrument 131, one or more keys calculated by lab computing device 133, and/or other data generated and/or captured by lab instrument 131 and/or lab computing device 133 (e.g., a unique identifier associated with the sample, a timestamp identifying when the measurement of the sample was taken, etc.).

At step 213, lab computing device 133 may broadcast the second data block to one or more other systems and/or devices (which may, e.g., also be included in the lab computing environment). For example, at step 213, lab computing device 133 may broadcast the second data block to smart instrument 121, smart instrument 123, and/or lab computing device 137 (e.g., by sending, transmitting, and/or otherwise communicating the second data block to smart instrument 121, smart instrument 123, and/or lab computing device 137). At step 214, smart instrument 121, smart instrument 123, and/or lab computing device 137 may request blockchain data from instrument data management computing platform 110. For instance, smart instrument 121, smart instrument 123, and/or lab computing device 137 may request part and/or all of the blockchain maintained by instrument data management computing platform 110 in which the measurement data and the one or more validation keys are stored. At step 215, instrument data management computing platform 110 may send blockchain data to smart instrument 121, smart instrument 123, and/or lab computing device 137. For example, at step 215, instrument data management computing platform 110 may send information associated with one or more portions of and/or all of the blockchain maintained by instrument data management computing platform 110 in which the measurement data and the one or more validation keys are stored (e.g., in response to receiving the request(s) from smart instrument 121, smart instrument 123, and/or lab computing device 137).

Figure 2D:
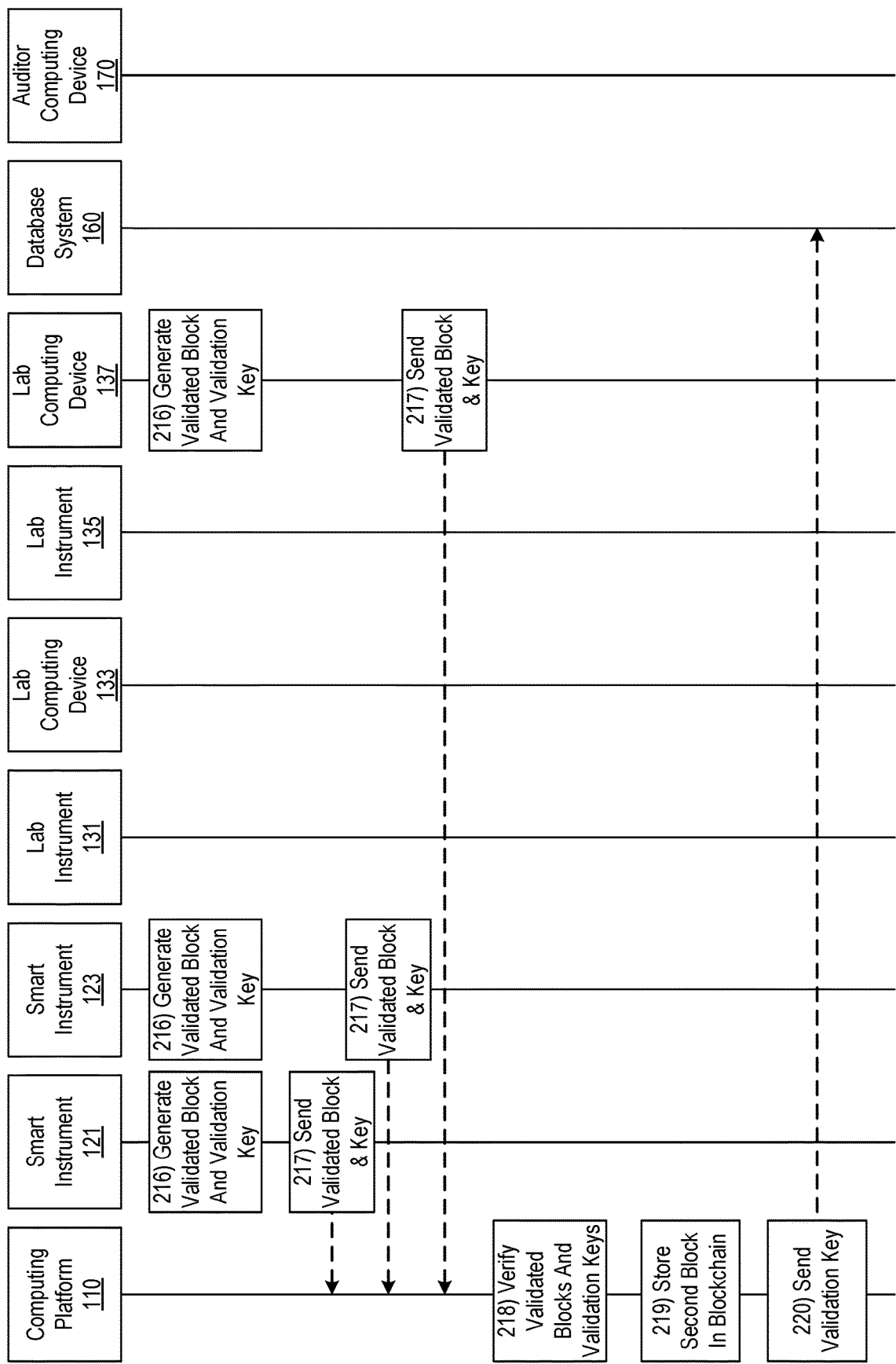

Referring to FIG. 2D, at step 216, smart instrument 121, smart instrument 123, and/or lab computing device 137 may generate a validated data block and a validation key (e.g., based on the second data block broadcast by and received from lab computing device 133 at step 213 and further based on the blockchain data received from instrument data management computing platform 110 at step 215). For instance, at step 216, smart instrument 121, smart instrument 123, and/or lab computing device 137 may calculate one or more validation keys from the contents of the second data block received from lab computing device 133 and from the blockchain data received from instrument data management computing platform 110.

At step 217, smart instrument 121, smart instrument 123, and/or lab computing device 137 may send the validated data block and the validation key to instrument data management computing platform 110. For example, at step 217, smart instrument 121, smart instrument 123, and/or lab computing device 137 may generate and send one or more validation messages to instrument data management computing platform 110 and/or to one or more other systems and/or devices (which may, e.g., also be included in the lab computing environment, such as smart instrument 121, smart instrument 123, and/or lab computing device 137). In some instances, smart instrument 121, smart instrument 123, and/or lab computing device 137 also may store the validated data block associated with the data received from lab computing device 133 and/or the calculated validation key associated with the data received from lab computing device 133 (e.g., in one or more blockchains being maintained by the respective instrument or device).

At step 218, instrument data management computing platform 110 may receive the validated data block(s) and the validation key(s) from smart instrument 121, smart instrument 123, and/or lab computing device 137 and may verify the validated data block(s) and the validation key(s) received from smart instrument 121, smart instrument 123, and/or lab computing device 137. For example, at step 218, instrument data management computing platform 110 may receive the second data block (e.g., from lab computing device 133) after the second data block has been broadcast to, validated by, and/or sent to instrument data management computing platform 110 via one or more of smart instrument 121, smart instrument 123, and/or lab computing device 137. For instance, instrument data management computing platform 110 may receive, via the communication interface (e.g., communication interface 113), from a second block generator (e.g., lab computing device 133), a second data block comprising second measurement data captured by a second instrument (e.g., lab instrument 131) and associated with the sample. In some instances, instrument data management computing platform 110 also may receive the second data block and/or one or more validation messages from one or more other systems and/or devices (which may, e.g., also be included in the lab computing environment, such as smart instrument 121, smart instrument 123, and/or lab computing device 137, and which also may maintain their own, independent, individual copies of the blockchain that is also maintained by instrument data management computing platform 110).

In some embodiments, receiving the second data block from the second block generator may include receiving the second data block from a second smart instrument that captured the second measurement data and generated the second data block. For example, in some instances, in receiving the second data block from the second block generator at step 218, instrument data management computing platform 110 may receive the second data block from a second smart instrument (e.g., smart instrument 123) that captured the second measurement data and generated the second data block.

In some embodiments, receiving the second data block from the second block generator may include receiving the second data block from a second lab computing device that generated the second data block using information received from a linked instrument. For example, in some instances, in receiving the second data block from the second block generator at step 218, instrument data management computing platform 110 may receive the second data block from a second lab computing device (e.g., lab computing device 137) that generated the second data block using information received from a linked instrument (e.g., lab instrument 135).

In addition, at step 218, instrument data management computing platform 110 may receive and verify a validation key for the second data block. For example, at step 218, instrument data management computing platform 110 may receive a second validation key for the second data block calculated from contents of the second data block. For instance, instrument data management computing platform 110 may receive the second validation key from one or more of smart instrument 121, smart instrument 123, and/or lab computing device 137, similar to how instrument data management computing platform 110 may receive the first validation key from one or more of smart instrument 123, lab computing device 133, and/or lab computing device 137. Additionally or alternatively, instrument data management computing platform 110 may verify the second validation key, similar to how instrument data management computing platform 110 may verify the first validation key (e.g., by calculating the second validation key based on the contents of the data block and/or one or more previous data blocks and/or validation keys, using one or more predefined key calculation algorithms that utilize the contents of the second data block as arguments and/or other input values).

At step 219, instrument data management computing platform 110 may store the second data block in the blockchain. For example, at step 219, instrument data management computing platform 110 may store the second data block and the second validation key for the second data block in the blockchain associated with the data management computing platform (e.g., instrument data management computing platform 110). For instance, instrument data management computing platform 110 may store the second data block and the second validation key for the second data block in the copy of the blockchain maintained by instrument data management computing platform 110 in blockchain database 112c.

At step 220, instrument data management computing platform 110 may send the validation key to data escrow database system 160. For example, at step 220, instrument data management computing platform 110 may send, via the communication interface (e.g., communication interface 113), to the data escrow database system (e.g., data escrow database system 160), the second validation key for the second data block. In addition, by sending the second validation key for the second data block to the data escrow database system (e.g., data escrow database system 160), instrument data management computing platform 110 may cause the data escrow database system (e.g., data escrow database system 160) to store the second validation key in the validation keys database (e.g., validation keys database 162c) maintained by the data escrow database system (e.g., data escrow database system 160). As in the example above with the first data block, instrument data management computing platform 110 thus may trigger data escrow database system 160 to add another element—i.e., the second validation key corresponding to the second data block—to the sequential chain of validation keys maintained by data escrow database system 160 in validation keys database 162c. This may enable instrument measurement data contained in the second data block and maintained in the blockchain by instrument data management computing platform 110 to be audited by a third party, as a lab researcher or other entity with access rights to the second data block might be able to provide the second validation key to an auditor, who can then verify the validation key with data escrow database system 160. In addition, this auditing may occur while maintaining the privacy and secrecy of the measurement data included in the second data block, because only the second validation key—and not the contents of the data block itself—may be sent to data escrow database system 160 by instrument data management computing platform 110.

Referring to FIG. 2E, at step 221, instrument data management computing platform 110 may receive a data integrity request. For example, at step 221, instrument data management computing platform 110 may receive a data integrity request in the form of input from a user (who may, e.g., be a lab researcher or other entity with access rights to the first data block, the second data block, and/or other data blocks stored in the blockchain maintained by instrument data management computing platform 110). In the example illustrated in FIG. 2E, the data integrity request may indicate that an auditor wishes to audit the first data block described in the examples above, and the request may trigger instrument data management computing platform 110 to send the first data block to auditor computing device 170 (which may, e.g., be associated with the auditor identified in the data integrity request). At step 222, instrument data management computing platform 110 may send the first data block to auditor computing device 170 (e.g., in accordance with the data integrity request received at step 217) along with any and/or all of the validation keys in the blockchain up to the point where the first data block exists in the blockchain. For instance, by sending all of the validation keys in the blockchain up to the point where the first data block exists in the blockchain to auditor computing device 170, instrument data management computing platform 110 may enable auditor computing device 170 to verify the integrity of the data and the validation keys in the blockchain.

At step 223, auditor computing device 170 may receive the first data block and the one or more validation keys from instrument data management computing platform 110. For example, in some instances, auditor computing device 170 may be configured to verify integrity of blockchain data associated with the blockchain using validation keys stored in the validation keys database (e.g., validation keys database 162c) maintained by the data escrow database system (e.g., data escrow database system 160). For instance, after receiving the first data block at step 223, auditor computing device 170 and/or the user of auditor computing device 170 may wish to decrypt the first data block and/or verify the integrity of the first data block. To do so, auditor computing device 170 and/or the user of auditor computing device 170 may compare the validation key corresponding to the first data block (which may, e.g., be received with the first data block from instrument data management computing platform 110 at step 223) with a corresponding validation key for the first data block maintained by data escrow database system 160, as illustrated below.

At step 224, auditor computing device 170 may send a request for a validation key corresponding to the first data block to data escrow database system 160. For instance, auditor computing device 170 may send this request based on receiving the first data block from instrument data management computing platform 110 and/or based on input received from a user of auditor computing device 170 (who may, e.g., wish to audit the measurement data associated with the first data block). This request may trigger data escrow database system 160 to identify a validation key corresponding to the first data block in the chain of validation keys maintained by data escrow database system 160 in validation keys database 162c and subsequently return this identified validation key to auditor computing device 170 for verification.

Figure 2F:
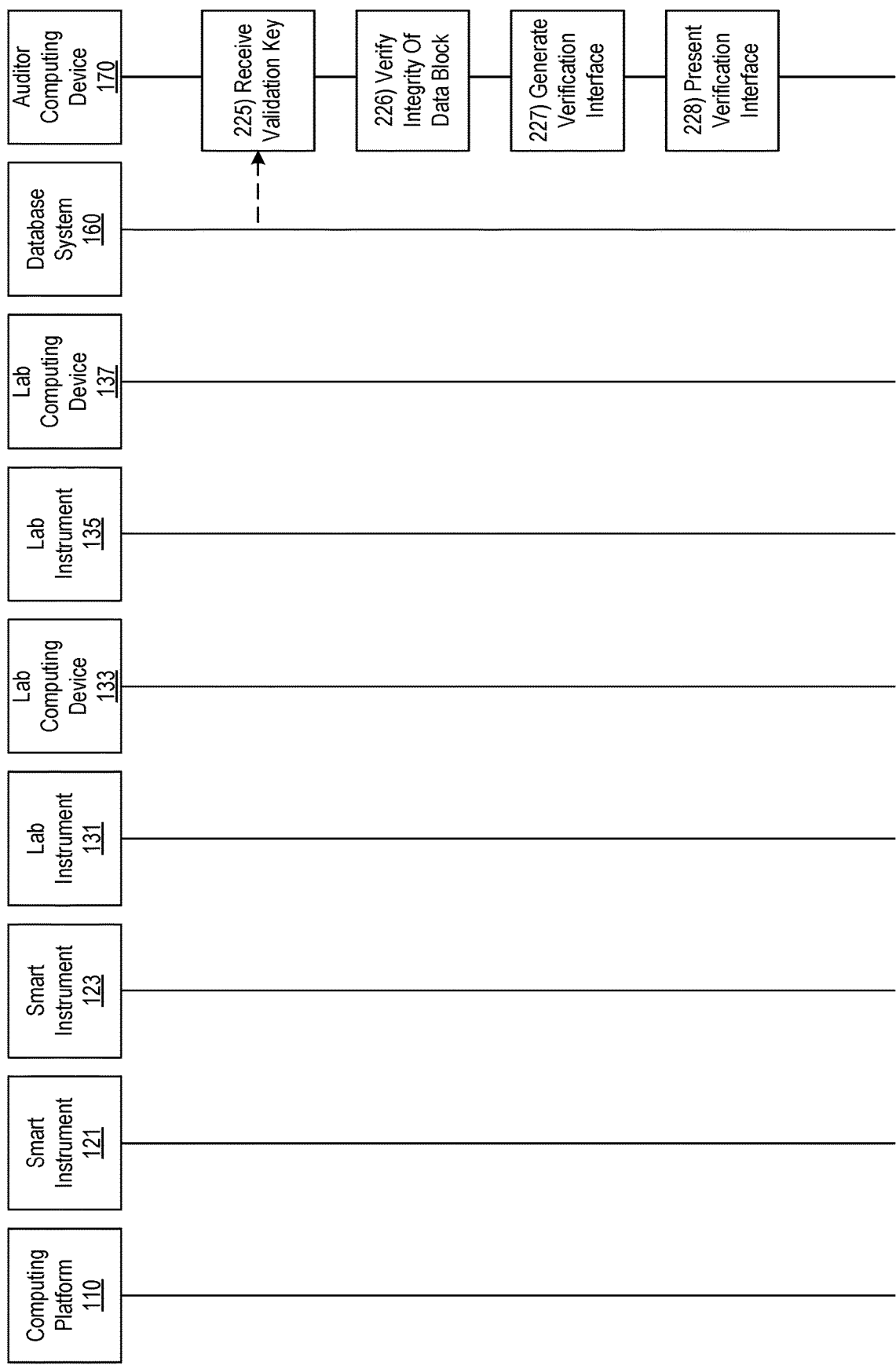

Referring to FIG. 2F, at step 225, auditor computing device 170 may receive the first validation key from data escrow database system 160. At step 226, auditor computing device 170 may verify the integrity of the first data block received from instrument data management computing platform 110 (e.g., using the first validation key received from data escrow database system 160). For example, in some instances, auditor computing device 170 may be configured to verify integrity of the first data block based on receiving a request comprising the first validation key from the first block generator. For instance, to verify the integrity of the first data block received from instrument data management computing platform 110 based on the first validation key received from data escrow database system 160, auditor computing device 170 may confirm that a validation key associated with the first data block and/or received with the first data block from instrument data management computing platform 110 matches the first validation key received from data escrow database system 160.

Figure 3:
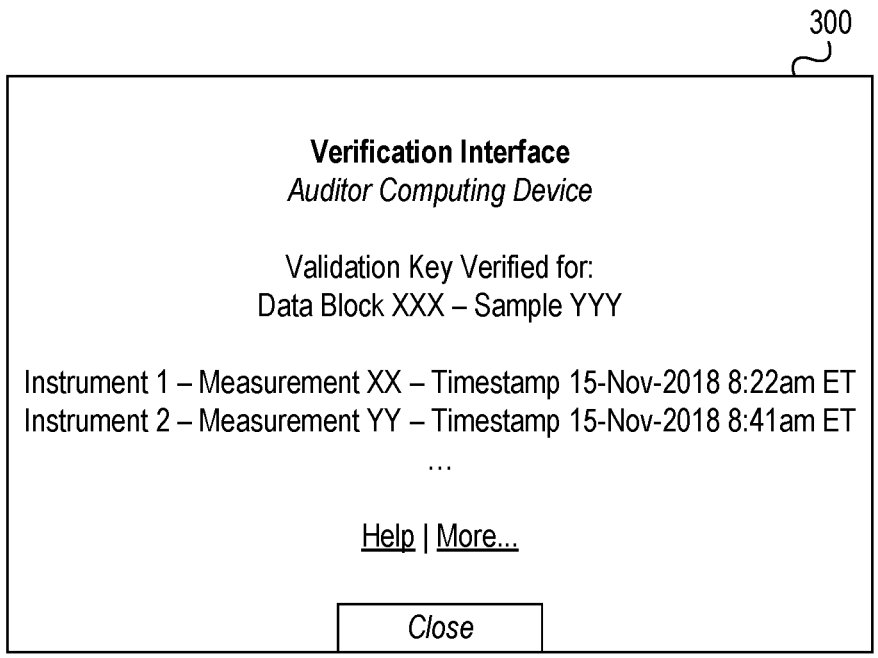
FIGS. 3 and 4 depict example graphical user interfaces for utilizing independently stored validation keys to enable auditing of instrument measurement data maintained in a blockchain in accordance with one or more example embodiments.
Figure 4:
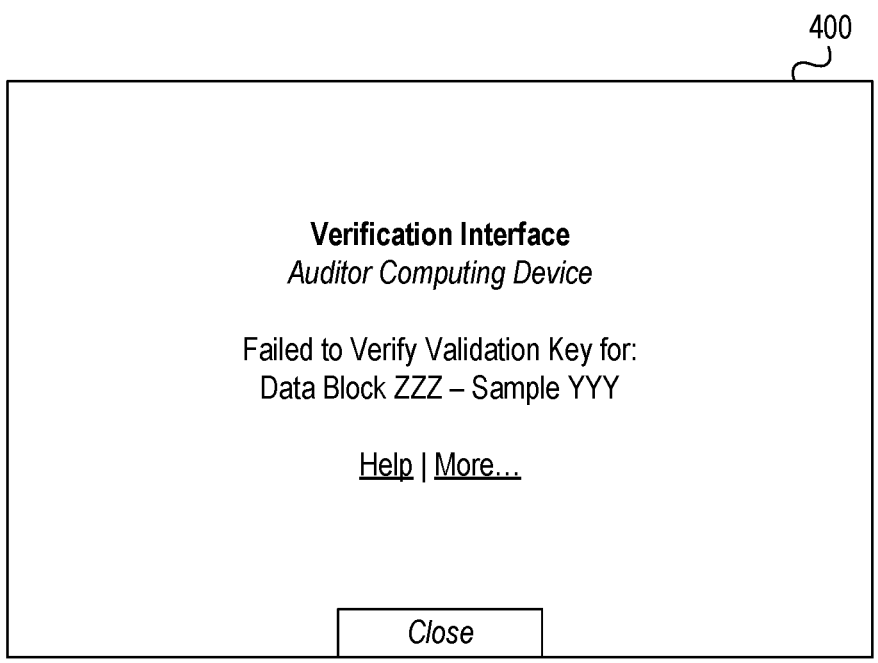

At step 227, auditor computing device 170 may generate a verification interface (e.g., based on verifying the integrity of the first data block received from instrument data management computing platform 110). At step 228, auditor computing device 170 may display and/or otherwise present the generated verification interface. For instance, if auditor computing device 170 is able to verify the integrity of the first data block received from instrument data management computing platform 110 (e.g., by confirming that a validation key associated with the first data block and/or received with the first data block from instrument data management computing platform 110 matches the first validation key received from data escrow database system 160), auditor computing device 170 may generate, display, and/or otherwise present a graphical user interface similar to graphical user interface 300, which is depicted in FIG. 3. As seen in FIG. 3, graphical user interface 300 may include text and/or other content indicating that the validation key for a specific data block has been verified, as well as information obtained from the contents of the data block, such as information identifying a sample, one or more measurements, one or more instruments, one or more timestamps, and/or other information. Alternatively, if auditor computing device 170 is not able to verify the integrity of the first data block received from instrument data management computing platform 110, auditor computing device 170 may generate, display, and/or otherwise present a graphical user interface similar to graphical user interface 400, which is depicted in FIG. 4. As seen in FIG. 4, graphical user interface 400 may include text and/or other content indicating that the validation key for a specific data block could not be verified.

As illustrated above, by implementing one or more aspects of the disclosure, one or more value propositions may be realized. For example, a trust theory may be implemented in which a trust broker (e.g., the entity operating data escrow database system 160) may be able to verify the chain to an auditor (e.g., the user of auditor computing device 170) without the trust broker having knowledge of the data elements in the chain. Moreover, one or more aspects of the disclosure provide several technology benefits over conventional blockchain implementations. For example, in a conventional blockchain implementation, to validate the integrity of a given block, one must validate the integrity of the entire blockchain, which typically requires substantial processing usage, network bandwidth consumption, and time. By contrast, in accordance with one or more aspects of the disclosure, the integrity of a given block (or a plurality of blocks) may be verified by validating the immutable list of validation keys (which may, e.g., be maintained by data escrow database system 160, as illustrated above). Thus, relative to a conventional blockchain implementation, one or more aspects of the disclosure provide various technical benefits that are rooted in computing technology, such as reduced processing usage and reduced network bandwidth consumption.

Although the example event sequence described above involves processing two data blocks, the usage of two data blocks in the example should be understood to be illustrative. In one or more embodiments, any number of data blocks, as well as any number of smart instruments and/or lab instruments, may be used in accordance with various aspects of the disclosure. Additionally, in some instances, a sample may be split, and multiple measurements may be made. These measurements may, for instance, be stored in a tree arrangement in which a new chain is created for a sub-sample and related to a preexisting chain for the parent sample. For example, a sample may be sub-divided, measurements may be taken of a resulting sub-sample, and measurement data may be stored in a plurality of related chains, as discussed in greater detail below.

Figure 5:
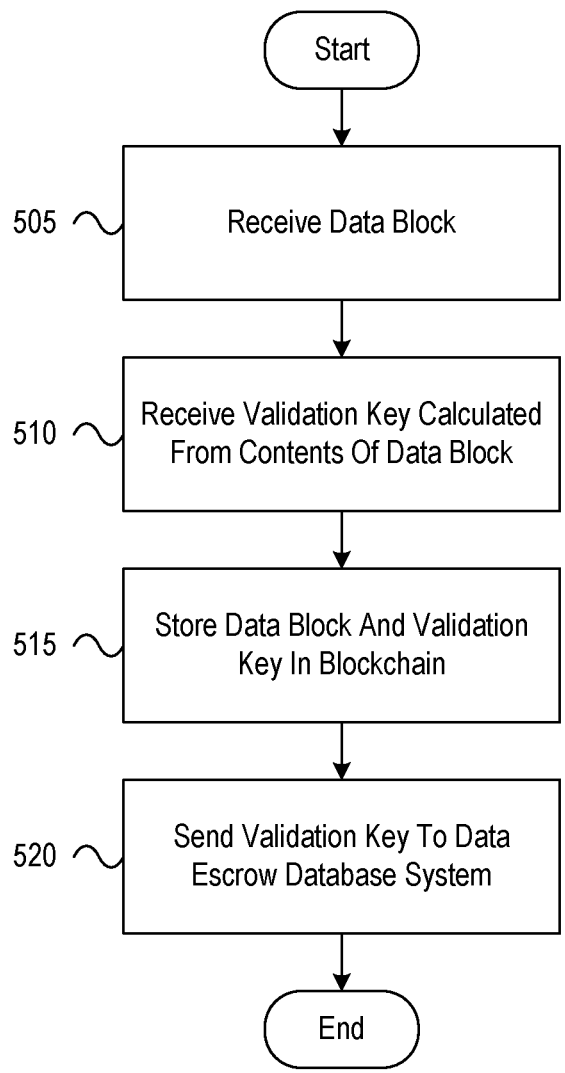
FIG. 5 depicts an illustrative method for utilizing independently stored validation keys to enable auditing of instrument measurement data maintained in a blockchain in accordance with one or more example embodiments.

FIG. 5 depicts an illustrative method for utilizing independently stored validation keys to enable auditing of instrument measurement data maintained in a blockchain in accordance with one or more example embodiments. Referring to FIG. 5, at step 505, a data management computing platform having at least one processor, a communication interface, and memory may receive, via the communication interface, from a first block generator, a first data block comprising first measurement data captured by a first instrument and associated with a sample. At step 510, the data management computing platform may receive a first validation key for the first data block calculated from contents of the first data block. For instance, the data management computing platform may receive the first validation key for the first data block from the first block generator and/or one or more additional block generators different from the first block generator. At step 515, the data management computing platform may store the first data block and the first validation key for the first data block in a blockchain associated with the data management computing platform. At step 520, the data management computing platform may send, via the communication interface, to a data escrow database system, the first validation key for the first data block. In addition, by sending the first validation key for the first data block to the data escrow database system, the data management computing platform may cause the data escrow database system to store the first validation key in a validation keys database maintained by the data escrow database system.

Figure 6A:
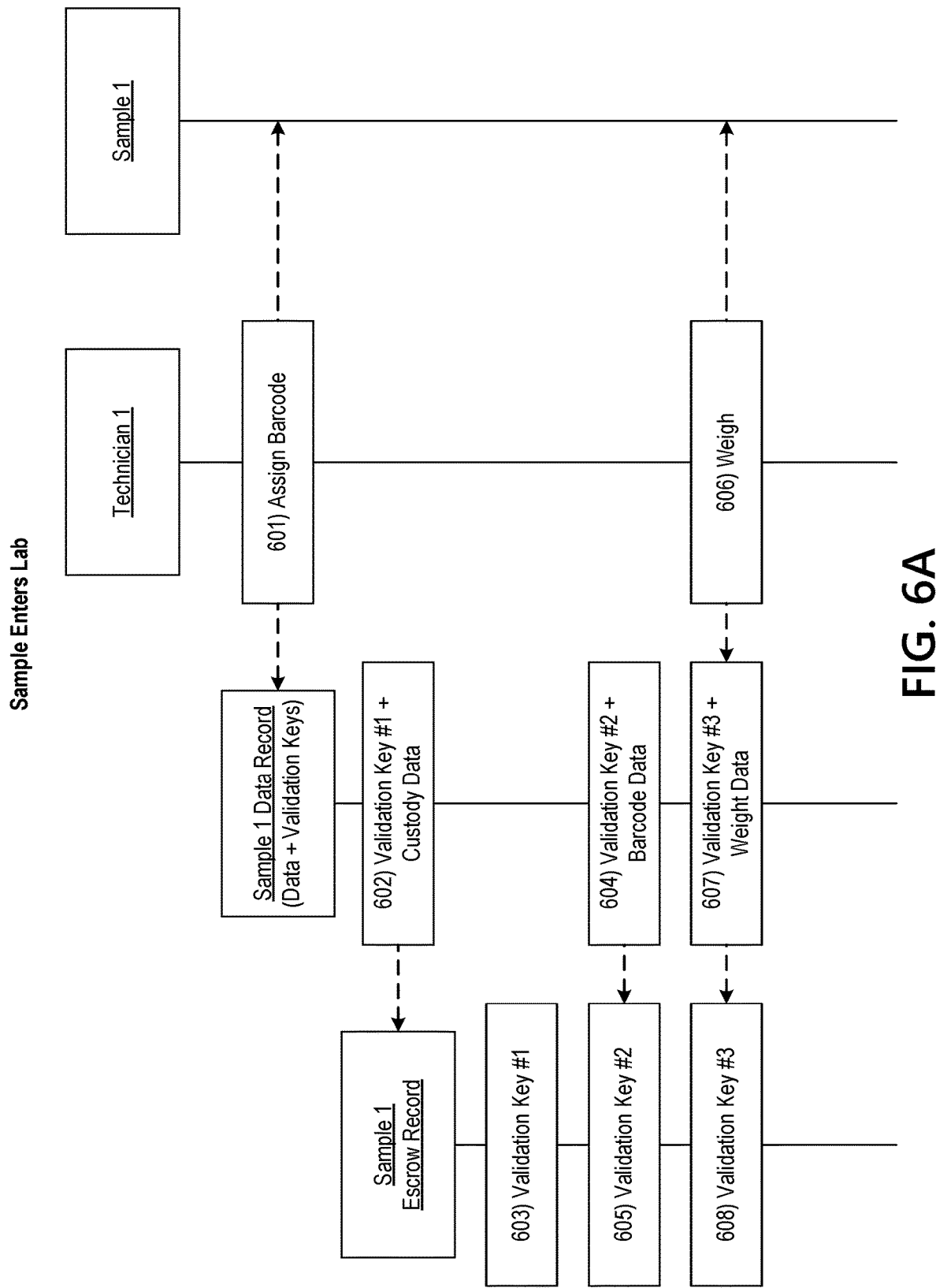
FIGS. 6A and 6B depict an illustrative event sequence in which a sample enters a lab, one or more measurements are taken, and instrument measurement data is stored in a blockchain in accordance with one or more example embodiments.
Figure 6B:
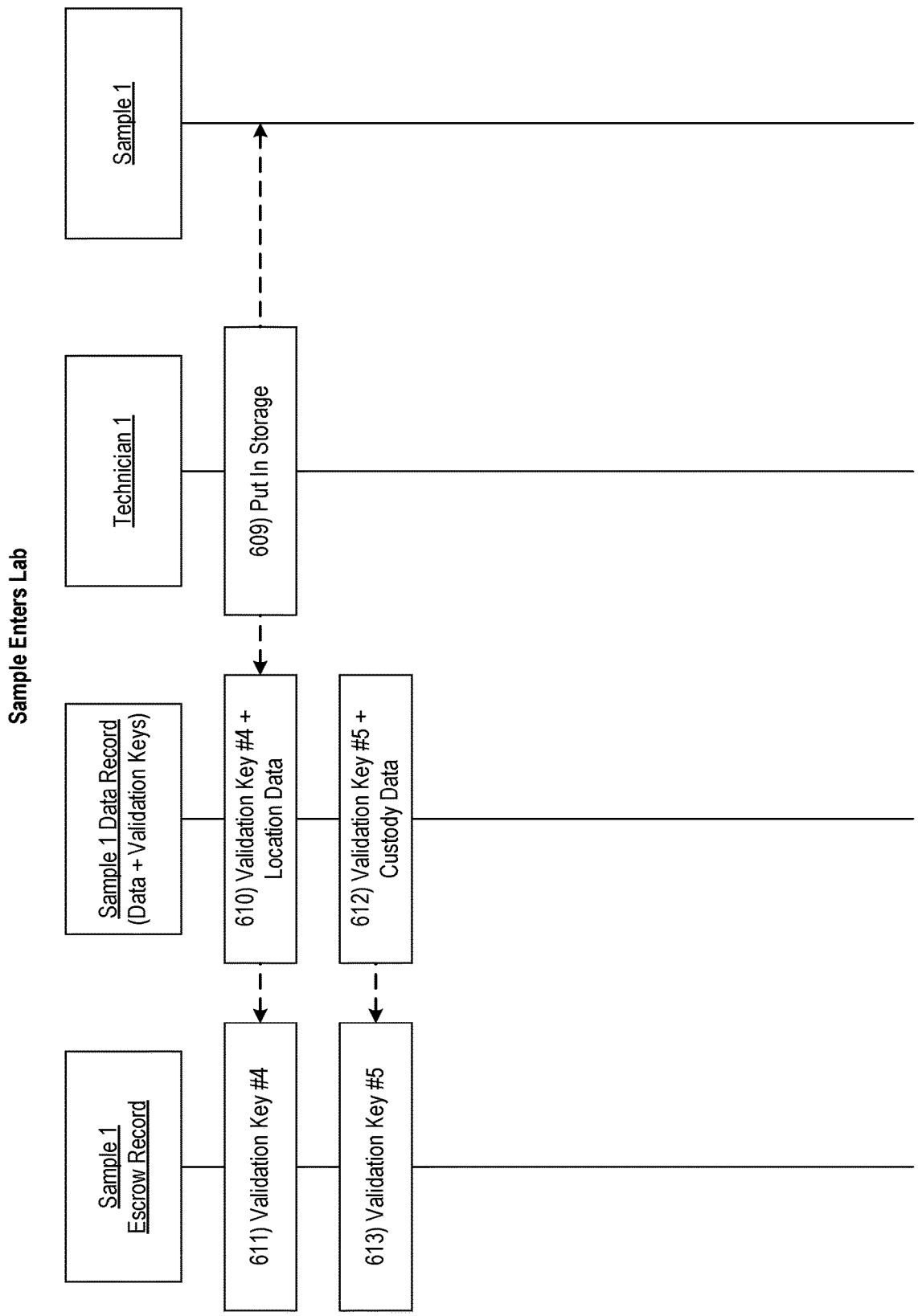

FIGS. 6A and 6B depict an illustrative event sequence in which a sample enters a lab, one or more measurements are taken, and instrument measurement data is stored in a blockchain in accordance with one or more example embodiments. Referring to FIG. 6A, at step 601, a first technician may assign a barcode to a sample (e.g., when the sample enters a lab). The barcode may be assigned to the sample by a smart instrument (e.g., smart instrument 121, smart instrument 123), a lab instrument (e.g., lab instrument 131, lab instrument 135), and/or a lab computing device (e.g., lab computing device 133, lab computing device 137) used by the first technician. In addition, the device used by the technician may transmit data to instrument data management computing platform 110, which may create a data record for the sample. At step 602, the data record for the sample (which may, e.g., be maintained by instrument data management computing platform 110 in a blockchain) may be updated to include a first validation key and custody data (e.g., indicating that the sample is in the possession of the first technician, based on the first technician assigning the barcode to the sample). The first validation key also may be sent to an escrow record for the sample (e.g., the validation key may be sent without the actual custody data). At step 603, the escrow record for the sample (which may, e.g., be maintained by data escrow database system 160 in a validation keys database) may be updated to include the first validation key.

At step 604, the data record for the sample (which may, e.g., be maintained by instrument data management computing platform 110 in the blockchain) may be updated to include a second validation key and barcode data (e.g., identifying one or more numerical values associated with the barcode assigned to the sample). In addition, at step 605, the escrow record for the sample (which may, e.g., be maintained by data escrow database system 160 in the validation keys database) may be updated to include the second validation key.

At step 606, the first technician may weigh the sample. For instance, the sample may be weighed using a smart instrument (e.g., smart instrument 121, smart instrument 123), a lab instrument (e.g., lab instrument 131, lab instrument 135), and/or a lab computing device (e.g., lab computing device 133, lab computing device 137) used by the first technician. At step 607, the data record for the sample (which may, e.g., be maintained by instrument data management computing platform 110 in the blockchain) may be updated to include a third validation key and weight data (e.g., identifying a weight of the sample as measured by the first technician). At step 608, the escrow record for the sample (which may, e.g., be maintained by data escrow database system 160 in the validation keys database) may be updated to include the third validation key.

Referring to FIG. 6B, at step 609, the first technician may put the sample in storage. For instance, the sample may be placed in a lab storage locker and its location may be captured and/or logged using a smart instrument (e.g., smart instrument 121, smart instrument 123), a lab instrument (e.g., lab instrument 131, lab instrument 135), and/or a lab computing device (e.g., lab computing device 133, lab computing device 137) used by the first technician. In some instances, the location of the sample may be tracked by a radiofrequency identifier (RFID) tag, and a location signal of the tag may be detected and logged by a smart instrument (e.g., smart instrument 121, smart instrument 123), a lab instrument (e.g., lab instrument 131, lab instrument 135), and/or a lab computing device (e.g., lab computing device 133, lab computing device 137). At step 610, the data record for the sample (which may, e.g., be maintained by instrument data management computing platform 110 in the blockchain) may be updated to include a fourth validation key and location data (e.g., identifying the updated location of the sample in the storage locker). At step 611, the escrow record for the sample (which may, e.g., be maintained by data escrow database system 160 in the validation keys database) may be updated to include the fourth validation key. At step 612, the data record for the sample (which may, e.g., be maintained by instrument data management computing platform 110 in the blockchain) may be updated to include a fifth validation key and custody data (e.g., indicating that the sample is no longer in the possession of the first technician, based on the sample being moved to the storage locker). At step 613, the escrow record for the sample (which may, e.g., be maintained by data escrow database system 160 in the validation keys database) may be updated to include the fifth validation key.

Figure 7A:
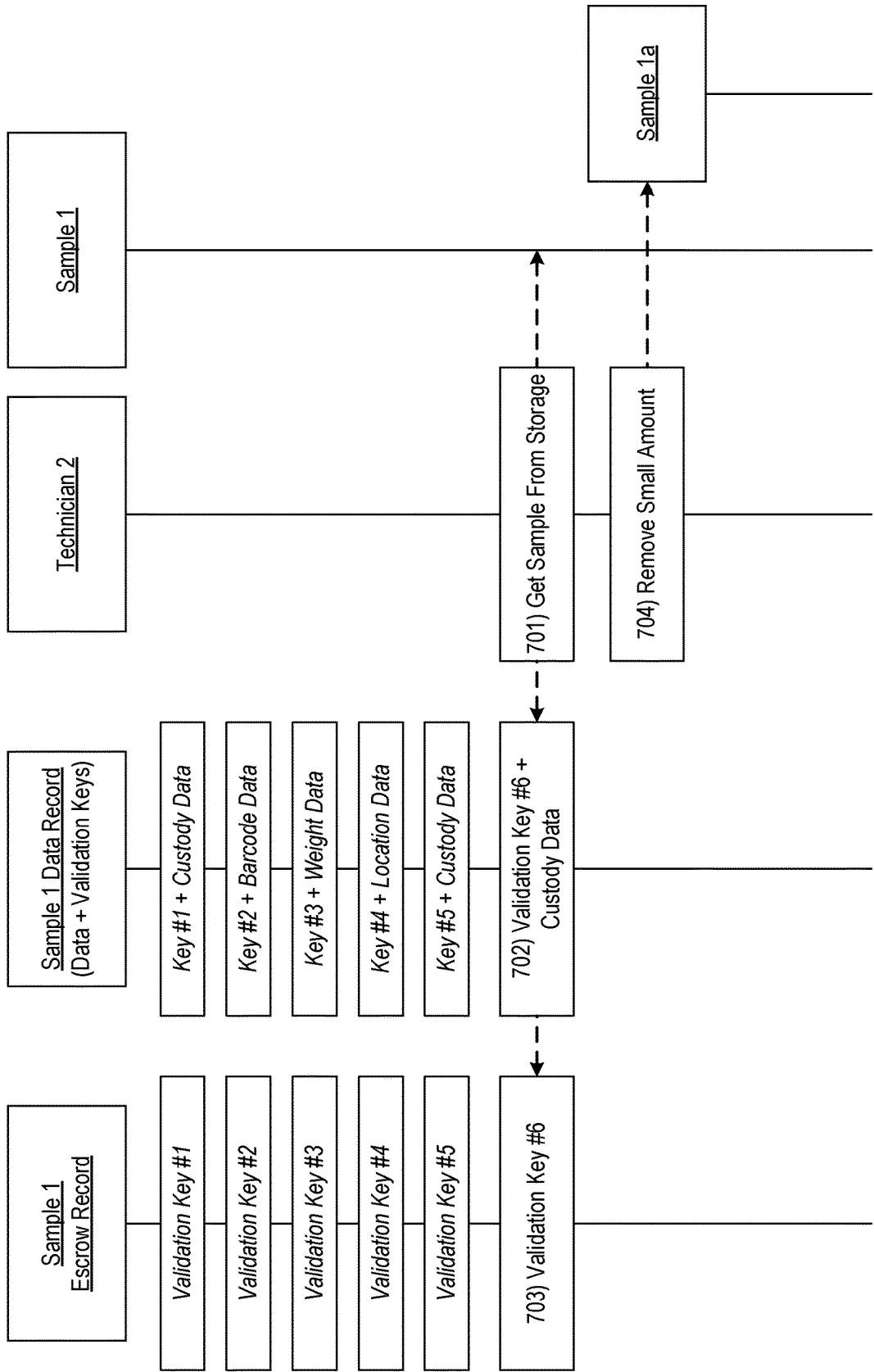
FIGS. 7A and 7B depict an illustrative event sequence in which a sample is subdivided, one or more measurements are taken, and instrument measurement data is stored in a blockchain in accordance with one or more example embodiments.
Figure 7B:
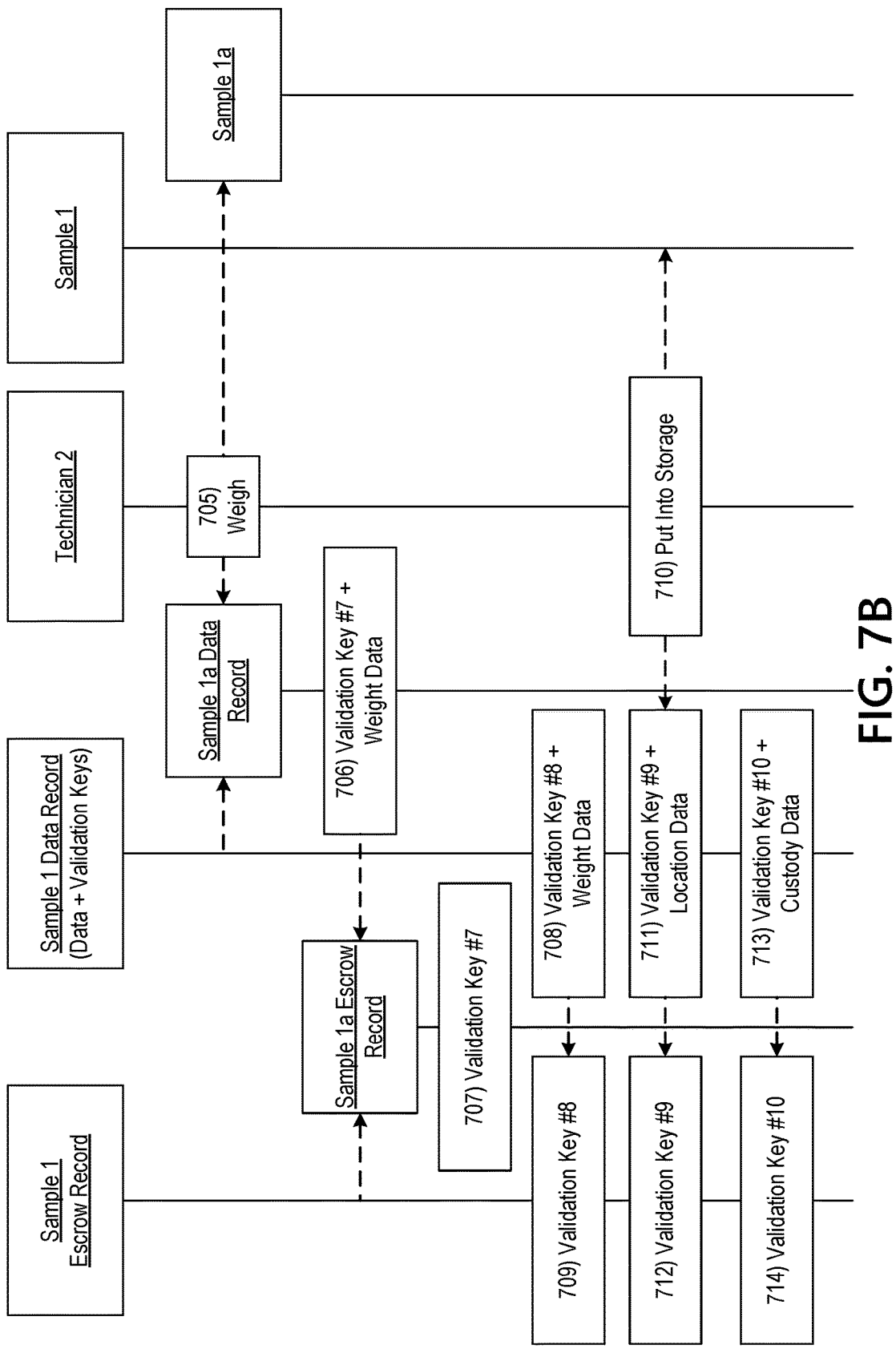

FIGS. 7A and 7B depict an illustrative event sequence in which a sample is subdivided, one or more measurements are taken, and instrument measurement data is stored in a blockchain in accordance with one or more example embodiments. In FIG. 7A, the example sequence may begin where the sequence illustrated in FIG. 6B ended. For example, the data record for the sample (which may, e.g., be maintained by instrument data management computing platform 110 in the blockchain) may include the sequence of validation keys and measurement data stored in the examples above, and the escrow record for the sample (which may, e.g., be maintained by data escrow database system 160 in the validation keys database) may include the sequence of validation keys stored above. For instance, some amount of time may elapse after the first technician places the sample in storage, and then at step 701, a second technician different from the first technician may retrieve the sample from storage. In addition, the removal of the sample from storage may be detected and/or logged using a smart instrument (e.g., smart instrument 121, smart instrument 123), a lab instrument (e.g., lab instrument 131, lab instrument 135), and/or a lab computing device (e.g., lab computing device 133, lab computing device 137) used by the second technician. At step 702, the data record for the sample (which may, e.g., be maintained by instrument data management computing platform 110 in the blockchain) may be updated to include a sixth validation key and custody data (e.g., indicating that the sample is now in the possession of the second technician, based on the sample being removed from the storage locker). At step 703, the escrow record for the sample (which may, e.g., be maintained by data escrow database system 160 in the validation keys database) may be updated to include the sixth validation key.

At step 704, the second technician may remove a small amount of the sample, thereby sub-dividing the sample and creating a new sub-sample. At step 705, the second technician may weigh the sub-sample. For instance, the sub-sample may be weighed using a smart instrument (e.g., smart instrument 121, smart instrument 123), a lab instrument (e.g., lab instrument 131, lab instrument 135), and/or a lab computing device (e.g., lab computing device 133, lab computing device 137) used by the second technician. In addition, the device used by the technician may transmit data to instrument data management computing platform 110, which may create a data record for the sub-sample. The data record for the sub-sample may be different from, but related to, the data record for the sample (i.e., the sample from which the sub-sample was extracted). At step 706, the data record for the sub-sample (which may, e.g., be maintained by instrument data management computing platform 110 in a new blockchain that is different from, but related to, the blockchain associated with the sample from which the sub-sample was extracted) may be updated to include a seventh validation key and weight data (e.g., identifying a weight of the sub-sample as measured by the second technician). The seventh validation key also may be sent to an escrow record for the sub-sample. At step 707, the escrow record for the sub-sample (which may, e.g., be created and maintained by data escrow database system 160 in a validation keys database) may be updated to include the seventh validation key.

At step 708, the data record for the sample (which may, e.g., be maintained by instrument data management computing platform 110 in the blockchain) may be updated to include an eighth validation key and weight data (e.g., identifying a new weight of the sample, since the sub-sample was removed). At step 709, the escrow record for the sample (which may, e.g., be maintained by data escrow database system 160 in the validation keys database) may be updated to include the eighth validation key.

At step 710, the second technician may put the sample in storage. For instance, the sample may be placed in a lab storage locker and its location may be captured and/or logged using a smart instrument (e.g., smart instrument 121, smart instrument 123), a lab instrument (e.g., lab instrument 131, lab instrument 135), and/or a lab computing device (e.g., lab computing device 133, lab computing device 137) used by the second technician. At step 711, the data record for the sample (which may, e.g., be maintained by instrument data management computing platform 110 in the blockchain) may be updated to include a ninth validation key and location data (e.g., identifying the updated location of the sample in the storage locker). At step 712, the escrow record for the sample (which may, e.g., be maintained by data escrow database system 160 in the validation keys database) may be updated to include the ninth validation key. At step 714, the data record for the sample (which may, e.g., be maintained by instrument data management computing platform 110 in the blockchain) may be updated to include a tenth validation key and custody data (e.g., indicating that the sample is no longer in the possession of the second technician, based on the sample being moved to the storage locker). At step 714, the escrow record for the sample (which may, e.g., be maintained by data escrow database system 160 in the validation keys database) may be updated to include the tenth validation key. At this point in the example event sequence, the sample itself may be located in the storage locker, but the sub-sample may still be in the laboratory and may be measured, as discussed in connection with the next example event sequence described below.

Figure 8A:
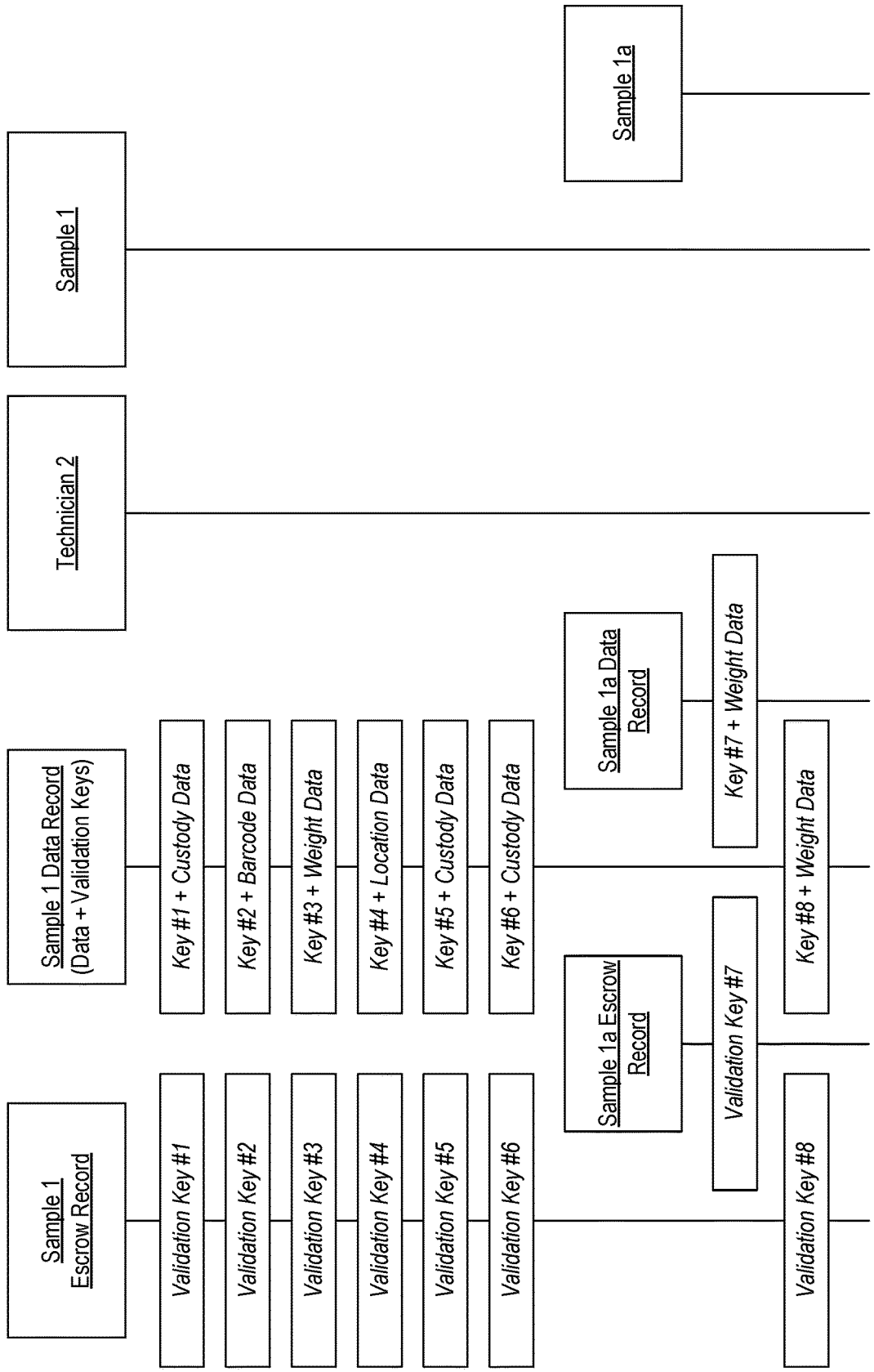
FIGS. 8A, 8B, and 8C depict an illustrative event sequence in which one or more measurements are taken of a sub-sample and instrument measurement data is stored in a blockchain in accordance with one or more example embodiments.
Figure 8B:
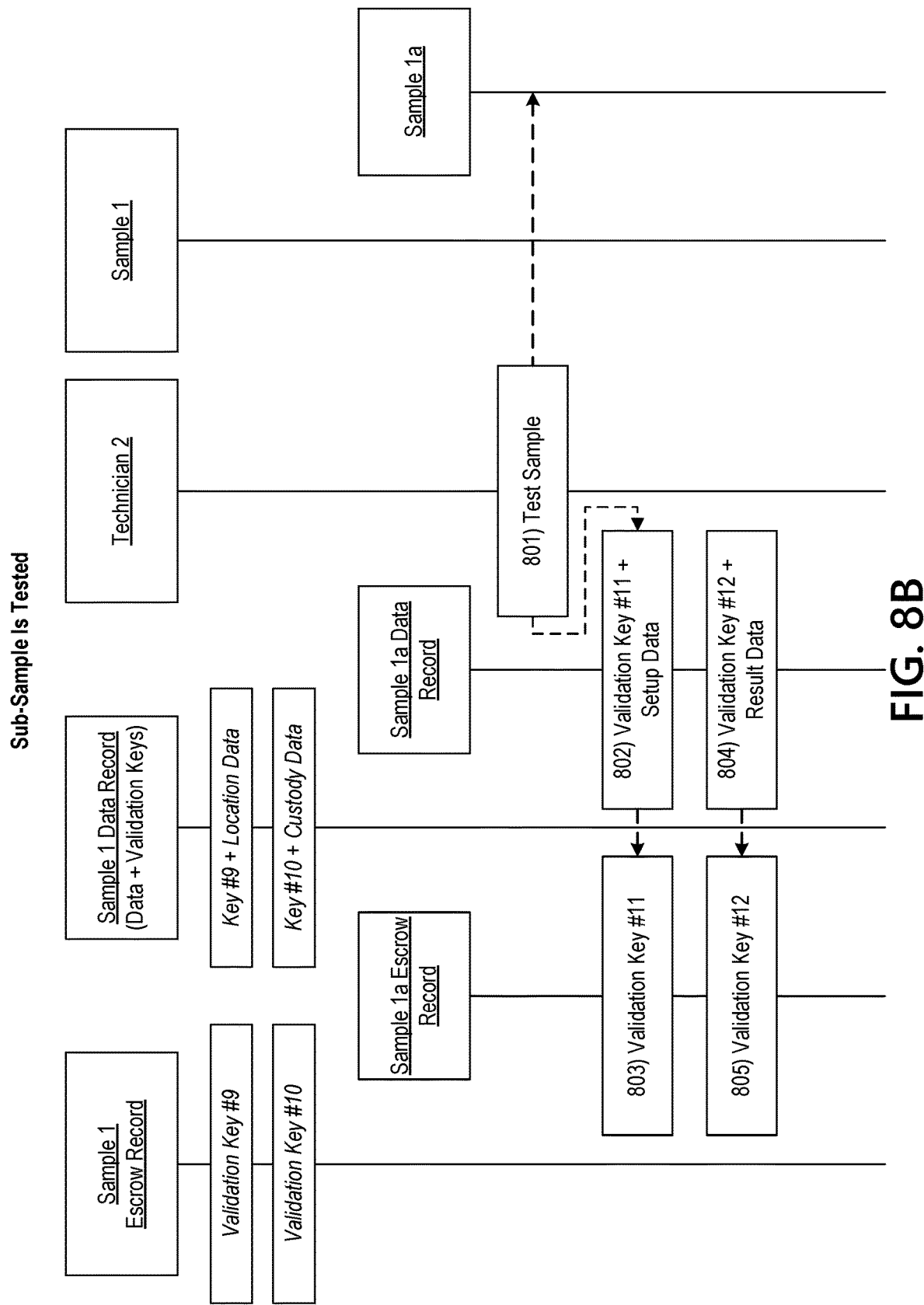
Figure 8C:
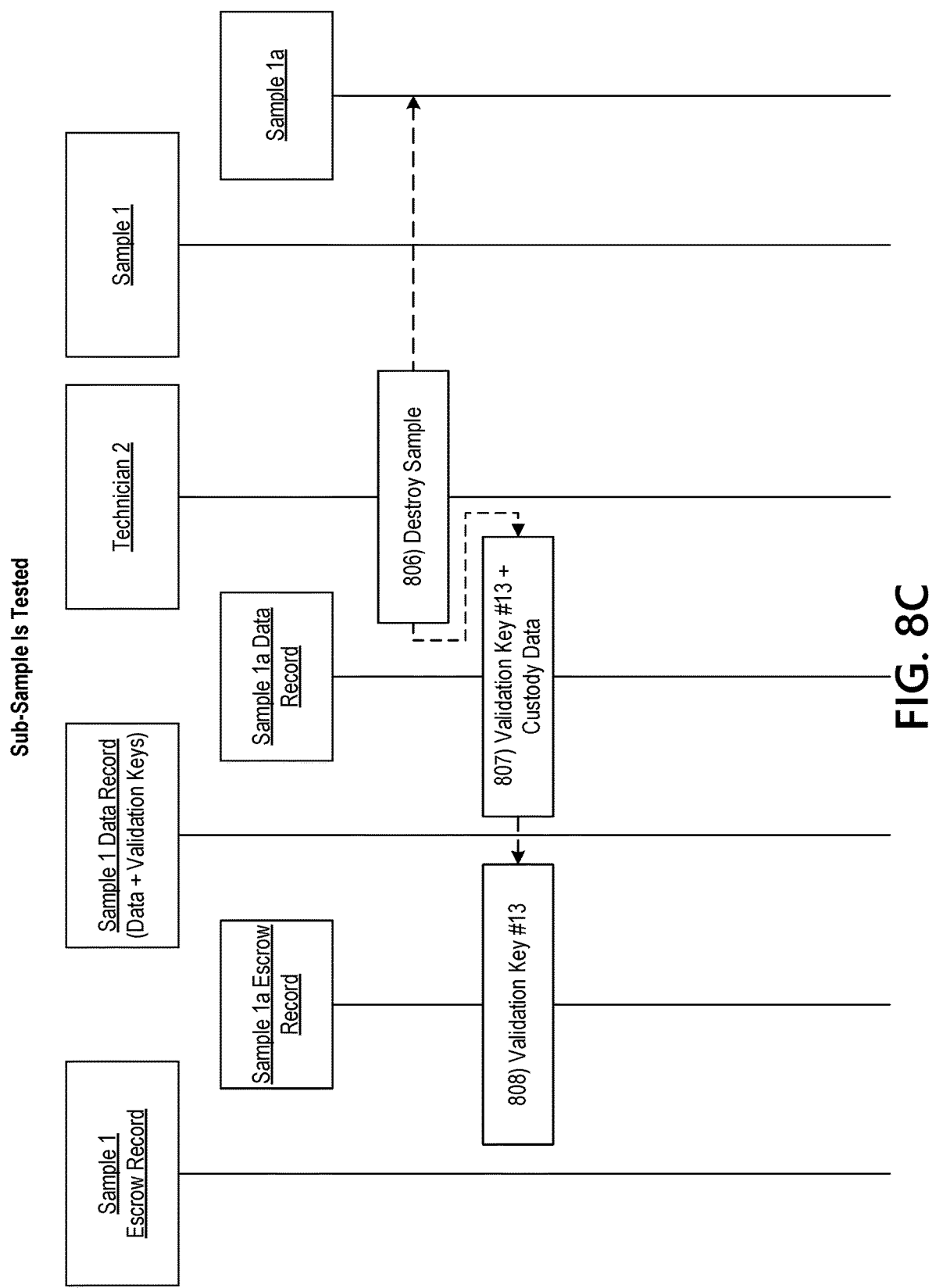

FIGS. 8A, 8B, and 8C depict an illustrative event sequence in which one or more measurements are taken of a sub-sample and instrument measurement data is stored in a blockchain in accordance with one or more example embodiments. In FIG. 8A, the example sequence may begin where the sequence illustrated in FIG. 7B ended. For example, the data record for the sample (which may, e.g., be maintained by instrument data management computing platform 110 in the blockchain) may include the sequence of validation keys and measurement data stored in the examples above, and the escrow record for the sample (which may, e.g., be maintained by data escrow database system 160 in the validation keys database) may include the sequence of validation keys stored above. In addition, the data record for the sub-sample (which may, e.g., be maintained by instrument data management computing platform 110 in a blockchain corresponding to the sub-sample that is different from, but related to, the blockchain corresponding to the sample) may include the sequence of validation keys and measurement data stored in the examples above, and the escrow record for the sub-sample (which may, e.g., be maintained by data escrow database system 160 in the validation keys database) may include the sequence of validation keys stored above.

For instance, as illustrated in FIGS. 8A and 8B, the escrow record for the sample (which may, e.g., be maintained by data escrow database system 160 in the validation keys database) may include the first validation key, the second validation key, the third validation key, the fourth validation, the fifth validation key, the sixth validation key, the eighth validation key, the ninth validation key, and the tenth validation key. The data record for the sample (which may, e.g., be maintained by instrument data management computing platform 110 in the blockchain) may include the first validation key and corresponding custody data, the second validation key and corresponding barcode data, the third validation key and corresponding weight data, the fourth validation and corresponding location data, the fifth validation key and corresponding custody data, the sixth validation key and corresponding custody data, the eighth validation key and corresponding weight data, the ninth validation key and corresponding location data, and the tenth validation key and corresponding custody data. In addition, the escrow record for the sub-sample (which may, e.g., be maintained by data escrow database system 160 in the validation keys database) may include the seventh validation key. Additionally, the data record for the sub-sample (which may, e.g., be maintained by instrument data management computing platform 110 in a blockchain corresponding to the sub-sample that is different from, but related to, the blockchain corresponding to the sample) may include the seventh validation key and corresponding weight data.

For example, picking up where FIG. 7B left off, the sub-sample may still be in the laboratory and now may be measured by the second technician. Referring to FIG. 8B, at step 801, the second technician may test the sub-sample. For instance, the sub-sample may be tested using a smart instrument (e.g., smart instrument 121, smart instrument 123), a lab instrument (e.g., lab instrument 131, lab instrument 135), and/or a lab computing device (e.g., lab computing device 133, lab computing device 137) used by the second technician. At step 802, the data record for the sub-sample (which may, e.g., be maintained by instrument data management computing platform 110 in the blockchain) may be updated to include an eleventh validation key and setup data (e.g., indicating an experiment setup used by the second technician). At step 803, the escrow record for the sub-sample (which may, e.g., be maintained by data escrow database system 160 in the validation keys database) may be updated to include the eleventh validation key.

At step 804, the data record for the sub-sample (which may, e.g., be maintained by instrument data management computing platform 110 in the blockchain) may be updated to include a twelfth validation key and result data (e.g., indicating one or more results of the experiment performed by the second technician). At step 805, the escrow record for the sub-sample (which may, e.g., be maintained by data escrow database system 160 in the validation keys database) may be updated to include the twelfth validation key.

Referring to FIG. 8C, at step 806, the second technician may destroy the sub-sample. For instance, the sub-sample may be destroyed using a smart instrument (e.g., smart instrument 121, smart instrument 123), a lab instrument (e.g., lab instrument 131, lab instrument 135), and/or a lab computing device (e.g., lab computing device 133, lab computing device 137) used by the second technician and/or the destruction of the sub-sample may be logged using a smart instrument (e.g., smart instrument 121, smart instrument 123), a lab instrument (e.g., lab instrument 131, lab instrument 135), and/or a lab computing device (e.g., lab computing device 133, lab computing device 137) used by the second technician. At step 807, the data record for the sub-sample (which may, e.g., be maintained by instrument data management computing platform 110 in the blockchain) may be updated to include a thirteenth validation key and custody data (e.g., indicating that the sub-sample is no longer in the possession of the second technician, based on the sub-sample being destroyed). At step 808, the escrow record for the sub-sample (which may, e.g., be maintained by data escrow database system 160 in the validation keys database) may be updated to include the thirteenth validation key.

In the examples above, after the various technicians have interacted with the sample and the sub-sample, and after the data records and escrow records have been updated, an auditor may be able verify the integrity of one or more of the data records using one or more of the escrow records, in accordance with one or more aspects of the disclosure. For example, because the data records for the sample and the sub-sample include the validation keys and associated measurement data, a lab technician may provide any and/or all of these data records to an auditor for verification of the data integrity. In addition, such an auditor may utilize one or more of the escrow records, as described above, to verify the data records received from the lab technician (e.g., based on the validation key(s) in the escrow records matching the validation key(s) in the data records). Moreover, and as described above, a trust broker maintaining the escrow keys may be able to verify the integrity of the blockchain data to the auditor, without having a copy of and/or knowledge of the data elements themselves in the blockchain, since only the sequence of validation keys is required to verify the integrity of the blockchain data. Further, and as described above, this computing implementation provides several technology benefits over conventional blockchain implementations. In particular, rather than validating the integrity of the entire blockchain, as in a conventional blockchain implementation, the integrity of a given block (or a plurality of blocks) may be verified by validating the immutable list of validation keys (which may, e.g., be maintained by data escrow database system 160), thereby increasing efficiency and reducing the consumption of computing resources, such as processing power and network bandwidth.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. One or more non-transitory computer-readable media storing instructions that, when executed by one or more processors, cause the one or more processors to perform steps comprising:
    receiving, via a communication interface of a computing platform and from a first block generator, a first data block comprising first measurement data, wherein the first data block is associated with a sample, wherein the first block generator is a separate device from the computing platform;
    generating, at the computing platform or at a second block generator, a first validation key calculated, using a key calculation algorithm, from contents of the first measurement data, wherein the first validation key does not include the contents of the first measurement data, wherein the second block generator is different from the computing platform and the first block generator, wherein the first validation key is calculated, using the key calculation algorithm, from the contents of the first data block and contents of a previous block in the blockchain or a second validation key corresponding to the previous block in the blockchain;
    before generating the first validation key, providing the first data block and the previous block in the blockchain or the second validation key corresponding to the previous block in the blockchain as arguments to the key calculation algorithm;
    storing the first data block and the first validation key in a blockchain at the computing platform; and
    providing, via the communication interface of the computing platform, the first validation key from the computing platform to a data escrow database system configured to store the first validation key in a validation keys database, wherein the validation keys database is independent of the blockchain, wherein the data escrow database system is a separate platform from the computing platform, the computing platform, the first block generator, and the second block generator, wherein the first measurement data is not sent to the data escrow database system, and wherein the data escrow database system securely stores the first validation key in an immutable list of validation keys to allow for verification of the first data block without requiring access to contents of the first measurement data.

2. The one or more non-transitory computer-readable media of claim 1, wherein the computer-readable instructions cause the one or more processors to perform further steps comprising:
    upon receiving, from an auditor computing device and via the communication interface, a request for a data integrity check of the first data block:
        providing, from the computing platform to the auditor computing device, the first validation key,
    wherein the auditor computing device is configured to validate the first data block by comparing the first validation key received from the computing platform with the first validation key stored in the validation keys database, and
    wherein the computing platform, the first block generator, and the second block generator are connected in a private network, and the data escrow database system and the auditor computing device are connected in a public network, separated from the private network by a firewall.

3. The one or more non-transitory computer-readable media of claim 2, wherein the computer-readable instructions cause the one or more processors to perform further steps comprising:
    receiving, via the communication interface and from a third block generator, a second data block comprising the first measurement data, wherein the third block generator is a separate device from the first block generator and the computing platform;
    generating, at the computing platform or at the third block generator, a second validation key calculated, using the key calculation algorithm, from contents of the second data block, wherein the second validation key does not include the contents of the first measurement data, wherein the third block generator is different from the first block generator, the second block generator, and the computing platform; and determining, at the computing platform, whether the first validation key and the second validation key match;

wherein storing the first data block and the first validation key in the blockchain at the computing platform is performed in response to the first validation key and the second validation key matching.

4. The one or more non-transitory computer-readable media of claim 3, wherein the first measurement data associated with the sample includes location data, custody data, or weight data.

5. The one or more non-transitory computer-readable media of claim 1, wherein the first block generator is included in an instrument generating the first measurement data.

6. The one or more non-transitory computer-readable media of claim 1, wherein the computer-readable instructions cause the one or more processors to perform further steps comprising:

before storing the first data block and the first validation key to the blockchain, receiving a second validation key.

7. One or more non-transitory computer-readable media storing instructions that, when executed by one or more processors, cause the one or more processors to perform steps comprising:

receiving, at a computing platform and from a first block generator, a first data block comprising first measurement data, wherein the first measurement data is associated with a sample, wherein the first block generator is a separate device from the computing platform;

generating, at the computing platform or at a second block generator, a first validation key calculated, using a key calculation algorithm, from contents of the first data block, wherein the first validation key does not include the contents of the first measurement data, wherein the second block generator is different from the computing platform and the first block generator, wherein the first validation key is calculated, using the key calculation algorithm, from the contents of the first data block and contents of a previous block in the blockchain or a second validation key corresponding to the previous block in the blockchain;

before generating the first validation key, providing the first data block and the previous block in the blockchain or the second validation key corresponding to the previous block in the blockchain as arguments to the key calculation algorithm;

storing the first data block and the first validation key in a blockchain at the computing platform; and providing, via a communication interface of the computing platform, the first validation key from the computing platform to an auditor computing device, the first validation key and the first data block for validation of the first data block, wherein the auditor computing device is configured to validate the first data block by comparing the first validation key with a first validation record stored in a validation keys database via a data escrow database system, wherein the validation keys database is independent of the blockchain, wherein the data escrow database system is a separate device from the computing platform, the auditor computing device, the first block generator, and the second block generator, and wherein the data escrow database system securely stores, as part of the first validation record, the first validation key in an immutable list of validation keys to allow for verification of the first data block without requiring access to contents of the first measurement data.

8. The one or more non-transitory computer-readable media of claim 7, wherein the computer-readable instructions cause the one or more processors to perform further steps comprising:

receive a second data block comprising record data associated with the sample;

generate a second validation key calculated, using the key calculation algorithm, from content of the second data block;

store, in the blockchain, the second data block and the second validation key; and provide the second validation key and the second data block to the auditor computing device for validation of the second data block, wherein the auditor computing device is configured to validate the second data block by comparing the second validation key with a second validation record stored in the validation keys database.

9. The one or more non-transitory computer-readable media of claim 8, wherein the first measurement data associated with the sample includes location data, custody data, or weight data.

10. The one or more non-transitory computer-readable media of claim 7, wherein, based on the first data block, validation keys are calculated by two or more devices, and wherein the computer-readable instructions cause the one or more processors to perform further steps comprising:

verifying the validation keys; and selecting, as the first validation key, one of the validation keys.

11. The one or more non-transitory computer-readable media of claim 7, wherein the computer-readable instructions cause the one or more processors to perform further steps comprising:

providing the first validation key to the data escrow database system configured to store the first validation key in the validation keys database as the first validation record.

12. A system for generating and auditing instrument data comprising:

a first block generator, configured to:

measure a sample and generate first measurement data associated with the sample; and broadcast a first data block comprising the first measurement data, a second block generator, a data escrow database system, and a computing platform comprising an electronic processor configured to:

receive, from the first block generator, the first data block;

receive, a first validation key calculated at the computing platform or at the second block generator, using a key calculation algorithm, from contents of the first data block, wherein the first validation key does not include the contents of the first measurement data, wherein the first validation key is calculated, using the key calculation algorithm, from the contents of the first data block and contents of a previous block in the blockchain or a second validation key corresponding to the previous block in the blockchain;

before generating the first validation key, provide the first data block and the previous block in the blockchain or the second validation key corresponding to the previous block in the blockchain as arguments to the key calculation algorithm;

store the first data block and the first validation key in a blockchain at the computing platform;

provide the first validation key to the data escrow database system configured to store the first validation key in a validation keys database, wherein the validation keys database is independent of the blockchain; and provide, from the computing platform to an auditor computing device, the first validation key from the blockchain for validation of the first data block, wherein the data escrow database system securely stores the first validation key in the validation keys database in an immutable list of validation keys to allow for the auditor computing device to verify the first data block by comparing the first validation key received from the computing platform with a validation record, including the first validation key, stored in the validation keys database without requiring access to the contents of the first measurement data.

13. The system of claim 12, wherein:
the data escrow database system is configured to store the validation key in the validation keys database as the validation record.

14. The system of claim 12, wherein the first validation key is calculated, using the key calculation algorithm, from the contents of the first data block and a previous block in the blockchain or a second validation key corresponding to the previous block in the blockchain.

15. The system of claim 12, wherein the electronic processor is further configured to:
generate the first validation key by providing the first data block and a previous block in the blockchain or a second validation key corresponding to the previous block in the blockchain as arguments to the key calculation algorithm.

* * * * *